(12) United States Patent
Morohoshi et al.

(10) Patent No.: US 6,386,317 B1
(45) Date of Patent: May 14, 2002

(54) SOUND-ABSORBING DUCT STRUCTURE

(75) Inventors: Katsumi Morohoshi; Kouichi Nemoto; Masashi Ito; Takeshi Yamauchi, all of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/468,540

(22) Filed: Dec. 21, 1999

(30) Foreign Application Priority Data

Dec. 21, 1998 (JP) .......................................... 10-362878

(51) Int. Cl.$^7$ .............................................. G10L 3/181
(52) U.S. Cl. ...................... 181/252; 181/224; 181/229
(58) Field of Search ................. 181/224, 229, 181/252, 256, 250, 232

(56) References Cited

U.S. PATENT DOCUMENTS

| | | | | | |
|---|---|---|---|---|---|
| 4,211,303 A | * | 7/1980 | Matthews et al. | ........... | 181/248 |
| 4,234,054 A | * | 11/1980 | Chapin | ........................ | 181/252 |
| 5,052,513 A | * | 10/1991 | Yoshikawa et al. | ......... | 181/246 |
| 5,526,324 A | * | 6/1996 | Cushman | ........................ | 367/1 |
| 5,702,230 A | * | 12/1997 | Kraft et al. | ................ | 415/119 |
| 6,109,387 A | * | 8/2000 | Boretti | ........................ | 181/230 |

FOREIGN PATENT DOCUMENTS

| | | |
|---|---|---|
| JP | 50-40720 | 12/1975 |
| JP | 53-148617 | 12/1978 |
| JP | 55-167562 | 5/1979 |
| JP | 64-53055 | 3/1989 |
| JP | 5-18329 | 1/1993 |
| JP | 5-18330 | 1/1993 |

* cited by examiner

Primary Examiner—Robert E. Nappi
Assistant Examiner—Kim Lockett
(74) Attorney, Agent, or Firm—Foley & Lardner

(57) ABSTRACT

A sound-absorbing duct structure for an intake system of an automotive internal combustion engine. The sound-absorbing duct structure comprises a duct defining therein-side a gas passage. A part of the duct is formed with a plurality of small holes. An expanded duct section is formed around the part of the duct. The expanded duct section defines therein an inside space which is in communication with the gas passage through the small holes. The inside space has a cross-sectional area larger than that of the gas passage. A sound-absorbing section is disposed in at least a part of the inside space of the first expanded duct section. The sound absorbing section includes a piezoelectric material exhibiting a piezoelectric effect, and an electrically conductive material in contact with the piezoelectric material.

16 Claims, 16 Drawing Sheets

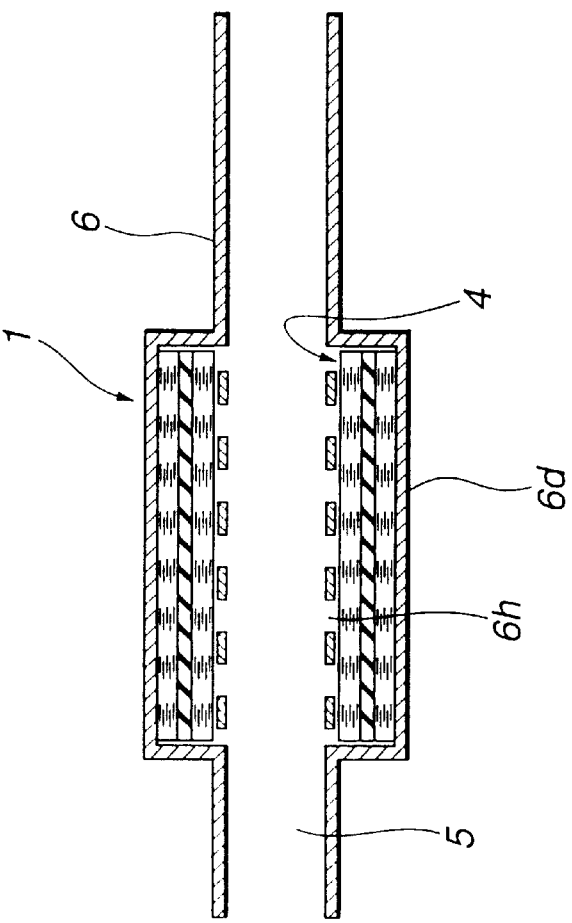
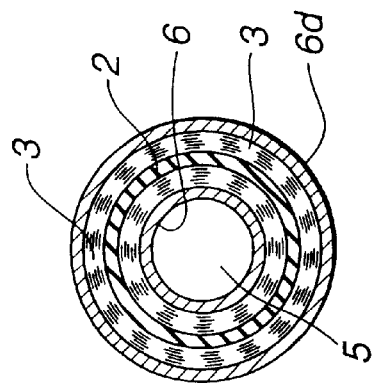
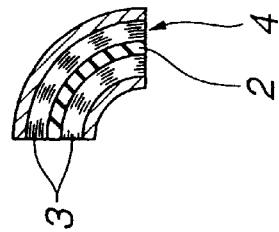

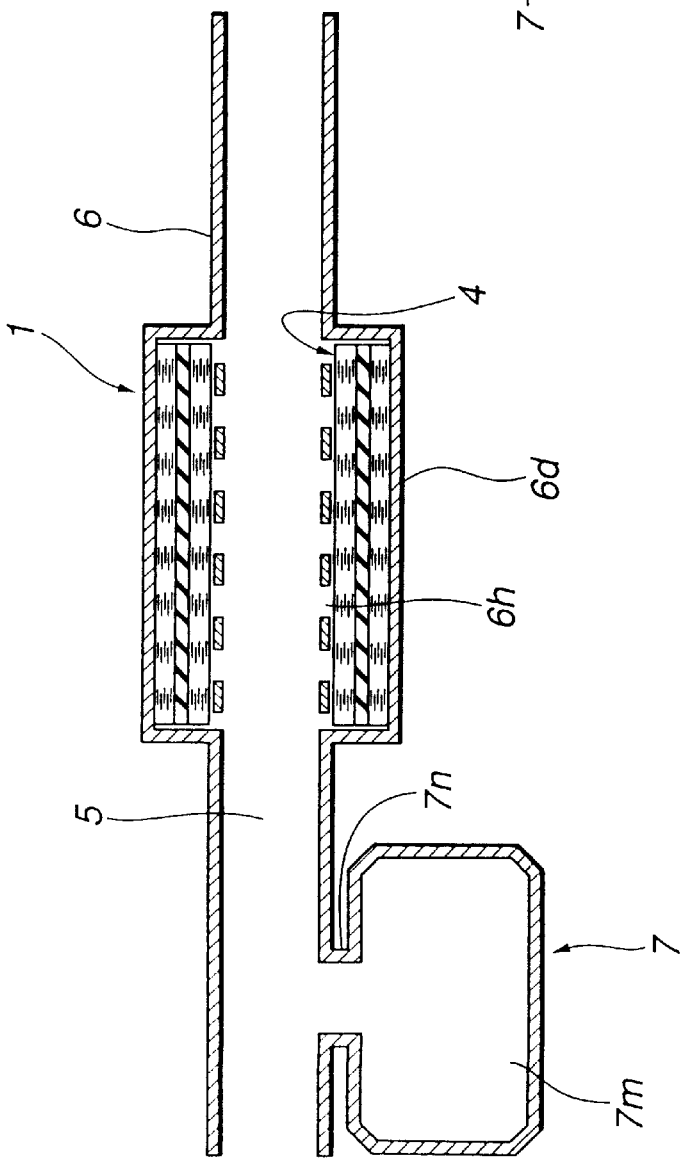
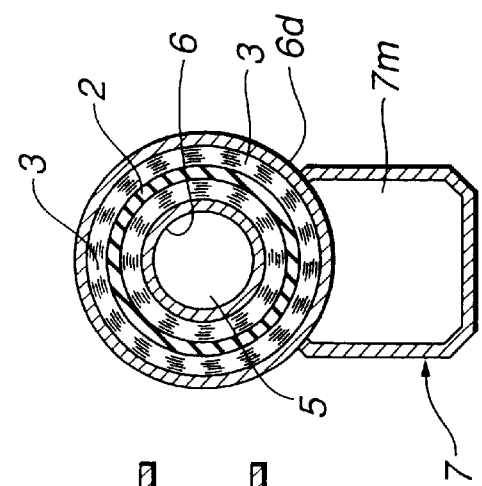
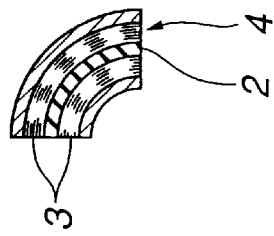

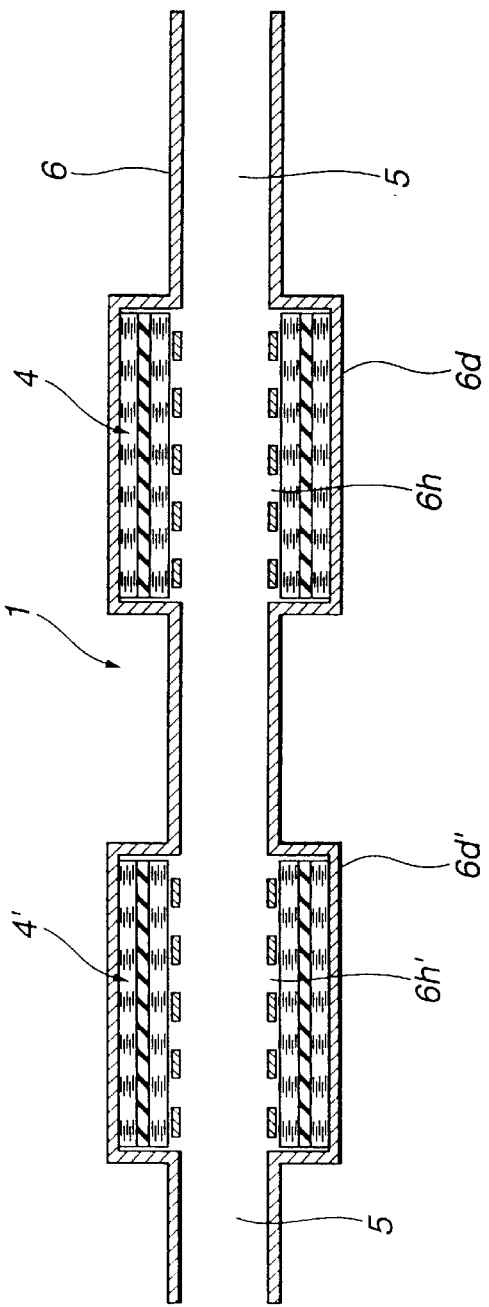
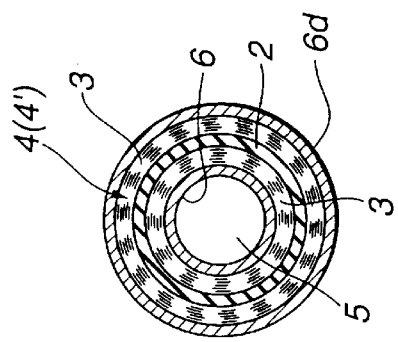
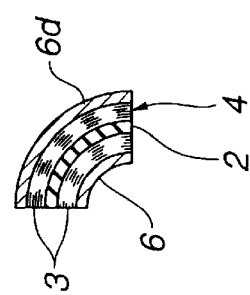

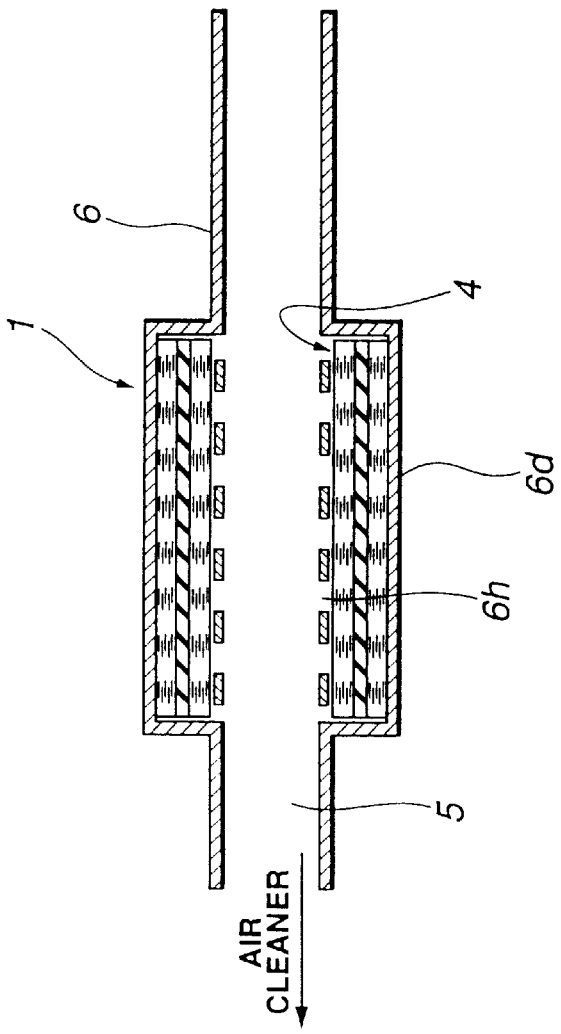
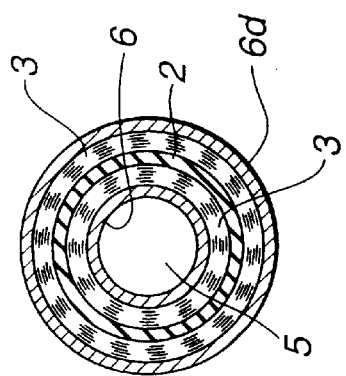
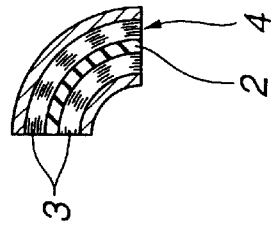

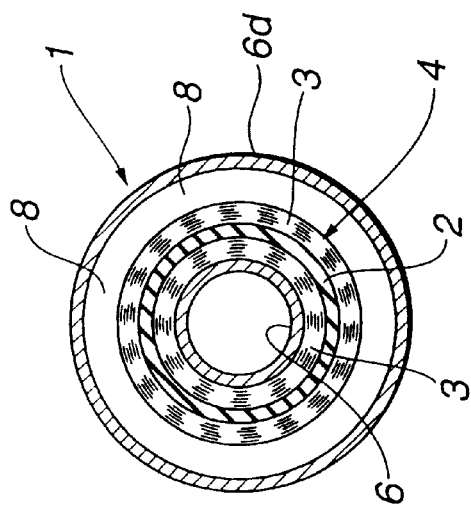
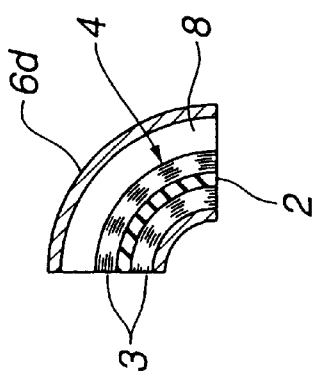
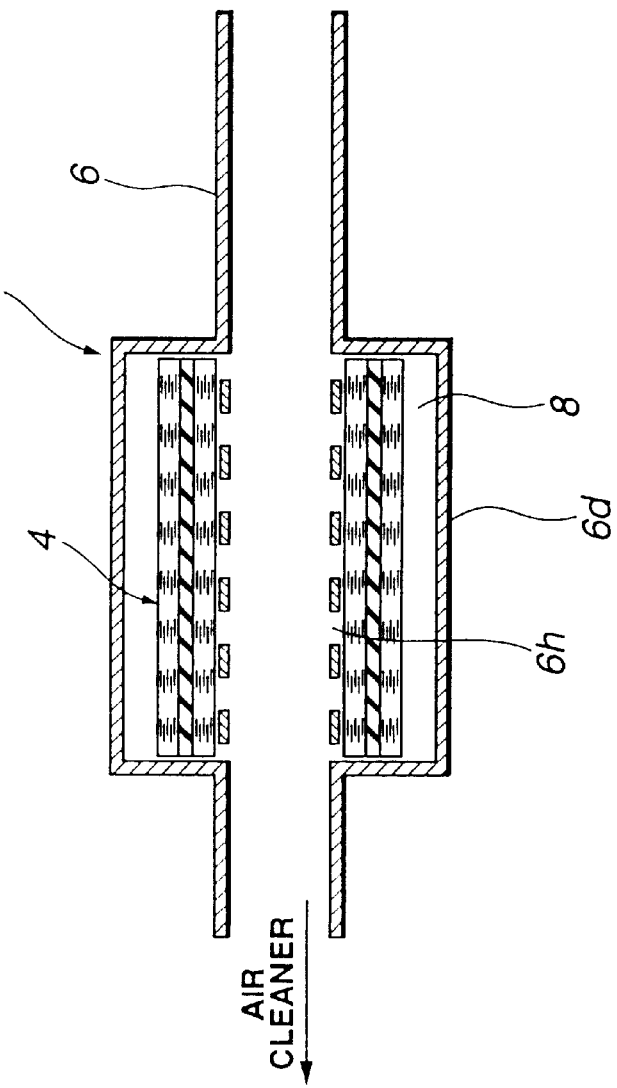

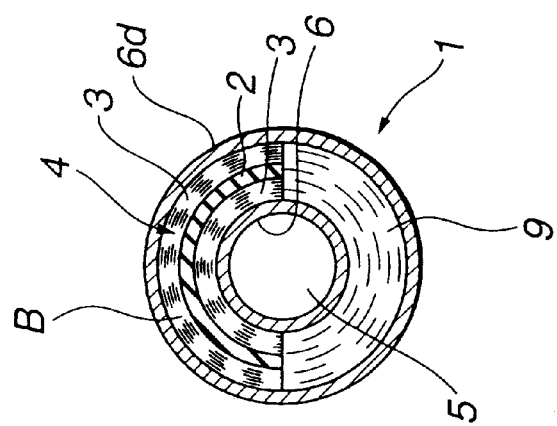
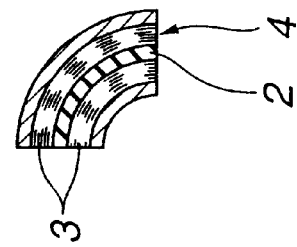
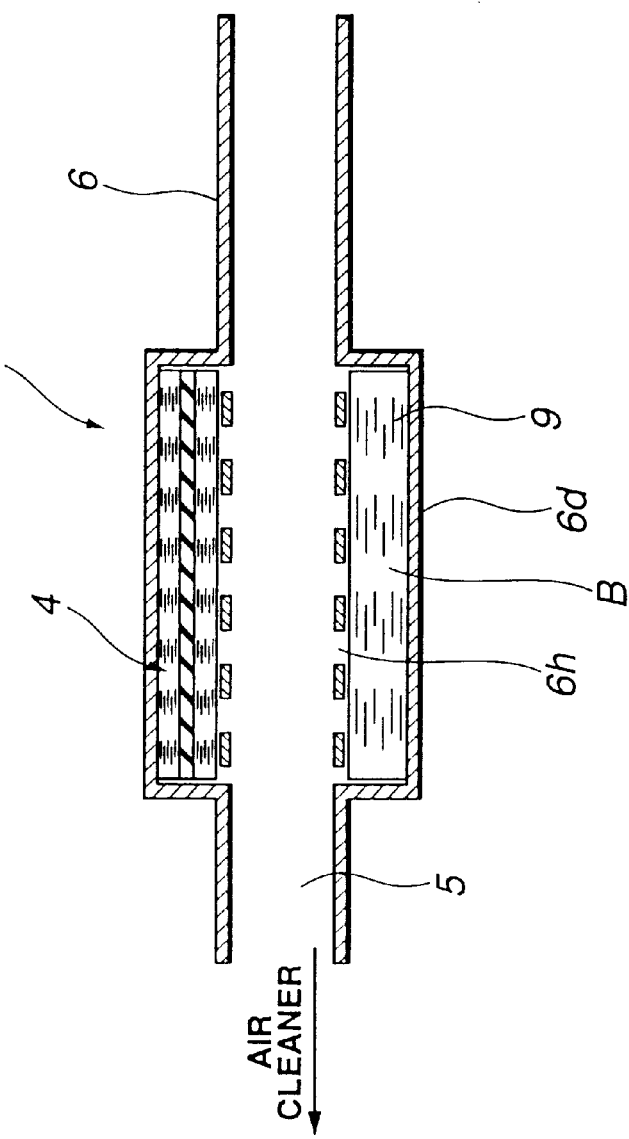

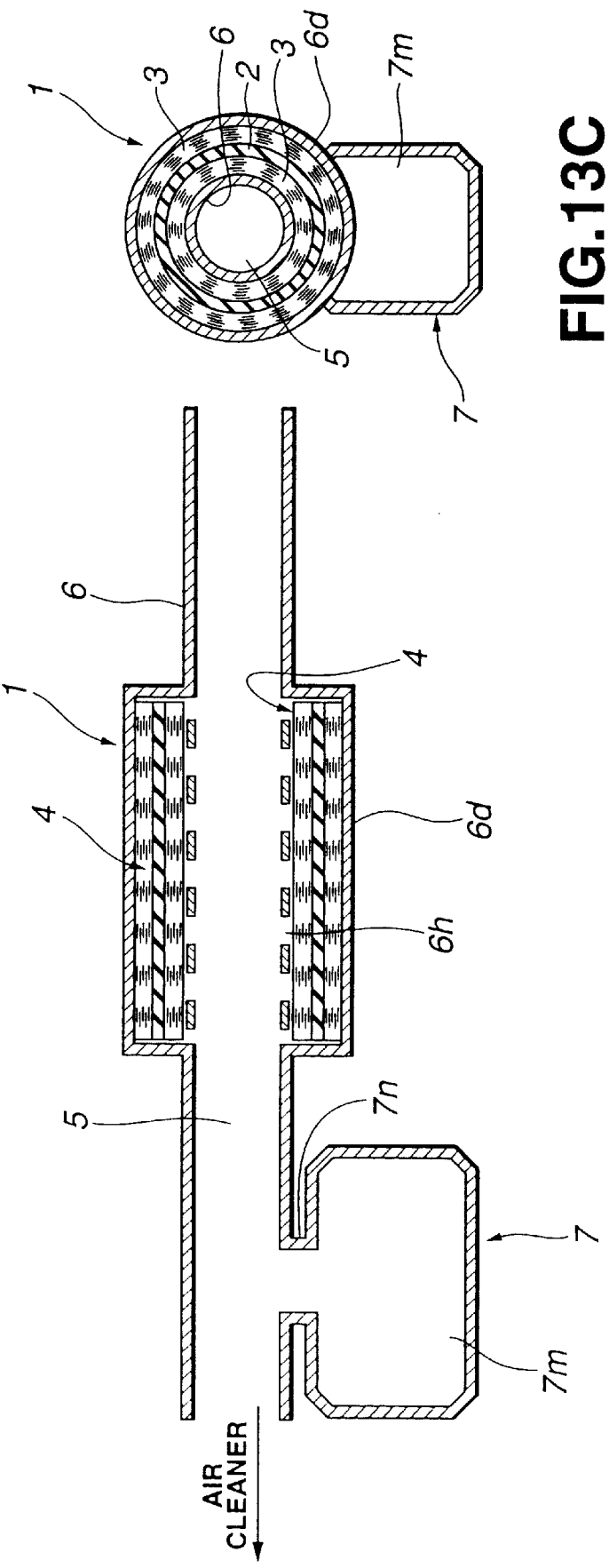
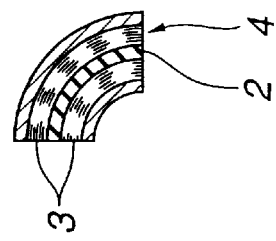

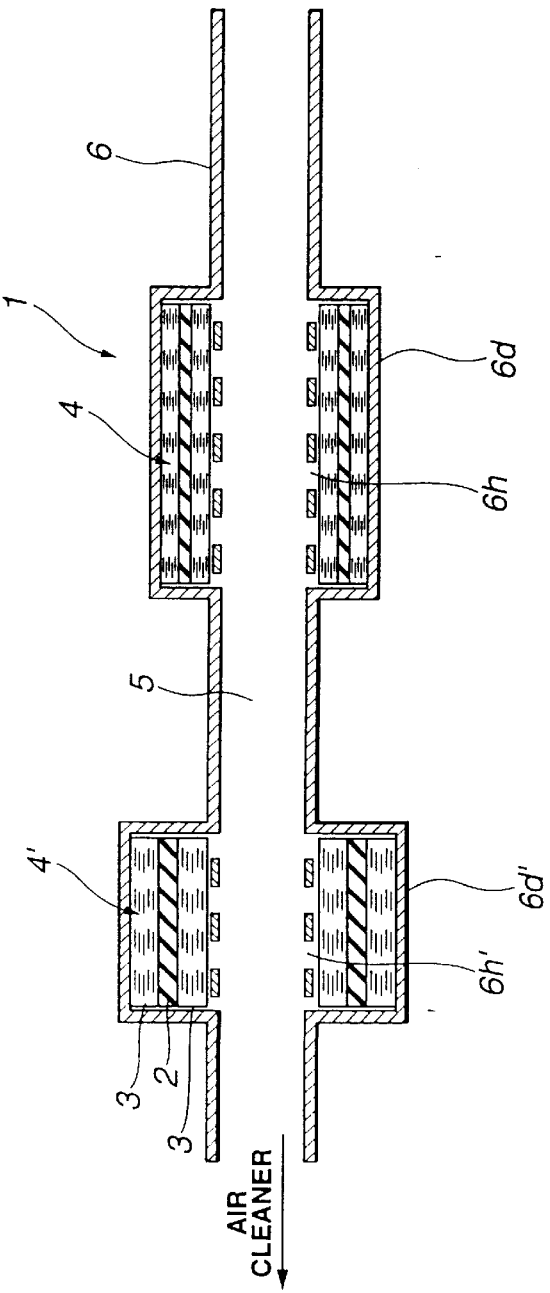
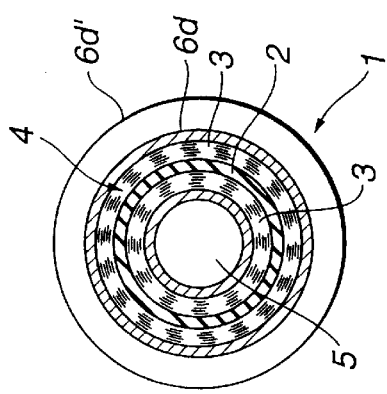
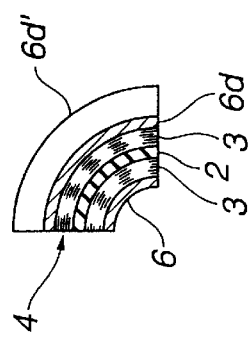

SOUND-ABSORBING DUCT STRUCTURE

BACKGROUND OF THE INVENTION

This invention relates to improvements in a sound-absorbing duct structure intended to sound absorption and insulation in automotive vehicles, architectural structures and the like, and more particularly to the sound-absorbing duct structure which exhibits excellent sound-absorbing effects throughout whole frequency ranges from low to high frequency ranges.

Hitherto much attention has been paid on noise generated in intake and exhaust systems for gaseous fluid, in which sources of the noise are, for example, noise generated by a blower, air stream noise of a blower, a high pressure valve and nozzle, intake and exhaust noise of an internal combustion engine and a gas generating machine, and burning noise of an oil burner or a gas burner. In order to reduce such noise, mufflers (silencers) and the like have been used in the intake and exhaust systems. Additionally, a sound-absorbing material such as glass wool has been used to reduce air stream noise in a high frequency range which noise is generated at a certain flow speed of the fluid flowing in a duct.

Reduction of such noise has been hitherto accomplished by minimizing a flow resistance of the fluid relative to the surface of the duct, by attenuating an acoustic energy serving as a noise source as much as possible, or by installing the sound-absorbing material, the mufflers and the like. Structures such as the mufflers are effective for noise in a particular frequency range but are not effective for noise in whole frequency ranges. The sound-absorbing materials are effective only for noise in a relatively high frequency range.

Air intake noise in an internal combustion engine is originated from pulsation of intake air of the engine and mainly in a low frequency range lower than 500 Hz. A sound-absorbing structure such as a resonator or a side branch structure is installed as a main measure in order to reduce such air intake noise. However, this sound-absorbing structure can exhibit noise reduction effect only for noise in a particular frequency range. Accordingly, installation of a plurality of such sound-absorbing structures is required for the purpose of reducing noise in a wide frequency range. It will be understood that such installation of the plurality of the sound-absorbing structures are difficult in case that a space for the sound-absorbing structures is limited or relatively small.

In addition, the following propositions on sound-absorbing duct structure have been hitherto made in order to reduce the above noise: A plurality of small holes are formed in an air intake pipe between a carburetor and an air cleaner, in which a sound-absorbing material is disposed around the air intake pipe, as disclosed in Japanese Patent Publication No. 53-148617 and Japanese Utility Model Provisional Publication No. 55-167562. A partition wall is provided to separate the side of an internal combustion engine and the side of an air cleaner element, in which the partition wall is formed with an orifice, as disclosed in Japanese Patent Provisional Publication No. 64-53055. A bypass tube is used in an air cleaner casing and a duct for the purpose of reducing noise, as disclosed in Japanese Patent Provisional Publication No. 5-18329. A particular resonance duct is connected to an air cleaner casing thereby to attenuate resonance in a particular frequency range, as disclosed in Japanese Patent Provisional Publication No. 5-18330. A sound-absorbing material is installed to the vicinity of an open end section of a duct structure; however, this is hardly effective for noise in a low frequency range.

SUMMARY OF THE INVENTION

Concerning noise in an intake system of an automotive vehicle, noise in a low frequency range lower than 500 Hz is basically problematic though the frequency range of noise changes in accordance with engine speed. Accordingly, it is desirable to obtain a sound-absorbing structure effective for reducing noise in whole frequency ranges including the above low frequency range. Additionally, it is also desirable to so arrange the sound-absorbing structure as to have a high performance and a compact configuration.

In view of the above, an object of the present invention is to provide an improved sound-absorbing duct structure for effectively overcoming drawbacks encountered in conventional sound-absorbing duct structures.

Another object of the present invention is to provide an improved sound-absorbing duct structure which is high in noise reducing effect particularly in a relatively low frequency range, while it can take a compact configuration.

A further object of the present invention is to provide an improved sound-absorbing duct structure which can effectively reduce noise in a wide frequency range, particularly a low frequency range, generated in a duct of intake and exhaust systems of an internal combustion engine, without providing any complicated devices.

An aspect of the present invention resides in a sound-absorbing duct structure comprising a sound-absorbing section arranged in communication with a gas passage. The sound-absorbing section includes an piezoelectric material exhibiting a piezoelectric effect, and an electrically conductive material in contact with the piezoelectric material.

Another aspect of the present invention resides in a sound-absorbing duct structure comprising a duct defining thereinside a gas passage, a part of the duct being formed with a plurality of small holes. An expanded duct section is formed around the part of the duct. The expanded duct section defines therein an inside space which is in communication with the gas passage through the small holes, the inside space having a cross-sectional area larger than that of the gas passage. A sound-absorbing section is disposed in at least a part of the inside space of the expanded duct section. The sound absorbing section includes a piezoelectric material exhibiting a piezoelectric effect, and an electrically conductive material in contact with the piezoelectric material.

A third aspect of the present invention resides in a sound-absorbing duct structure for an intake system of an automotive internal combustion engine. The sound-absorbing duct structure comprises a duct defining thereinside a gas passage, a part of the duct being formed with a plurality of small holes. The duct is connected to an air intake duct of an air cleaner so that the gas passage forms part of an air intake passage through which intake air is supplied to the engine. An expanded duct section is formed around the part of the duct and defines therein an inside space which is in communication with the gas passage through the small holes, the inside space having a cross-sectional area larger than that of the gas passage. A sound-absorbing section is disposed in at least a part of the inside space of the expanded duct section, the sound absorbing section including an piezoelectric material exhibiting a piezoelectric effect, and an electrically conductive material in contact with the piezoelectric material.

A fourth aspect of the present invention resides in a method of absorbing sound in a gas passage. The method comprises (a) disposing a sound-absorbing section in communication with the gas passage, the sound-absorbing section including an piezoelectric material exhibiting a piezoelectric effect, and an electrically conductive material in contact with the piezoelectric material; and (b) causing a gas to flow through the gas passage so as to allow a sound pressure due to flow of the gas is absorbed in the sound-absorbing section.

BRIEF DESCRIPTION OF THE DRAWINGS

In the drawings, like reference numerals designate like parts and elements throughout all figures, in which:

FIG. 2A is a longitudinal sectional view of a second embodiment of the sound-absorbing duct structure according to the present invention;

FIG. 2B is a vertical sectional view of the sound-absorbing duct structure of FIG. 2A;

FIG. 2C is a fragmentary sectional view of the sound-absorbing duct structure of FIG. 2A;

FIG. 3A is a longitudinal sectional view of a third embodiment of the sound-absorbing duct structure according to the present invention;

FIG. 3B is a vertical sectional view of the sound-absorbing duct structure of FIG. 3A;

FIG. 3C is a fragmentary sectional view of the sound-absorbing duct structure of FIG. 3A;

FIG. 4A is a longitudinal sectional view of a fourth embodiment of the sound-absorbing duct structure according to the present invention;

FIG. 4B is a vertical sectional view of the sound-absorbing duct structure of FIG. 4A;

FIG. 4C is a fragmentary sectional view of the sound-absorbing duct structure of FIG. 4A;

FIG. 9A is a longitudinal sectional view of the sound-absorbing duct structure of Example 2 according to the present invention, in a state to be set in the measurement system of FIG. 7;

FIG. 9B is a vertical sectional view of the sound-absorbing duct structure of FIG. 9A;

FIG. 9C is a fragmentary sectional view of the sound-absorbing duct structure of FIG. 9A;

FIG. 10A is a longitudinal sectional view of the sound-absorbing duct structure of Example 3 according to the present invention, in a state to be set in the measurement system of FIG. 7;

FIG. 10B is a vertical sectional view of the sound-absorbing duct structure of FIG. 10A;

FIG. 10C is a fragmentary sectional view of the sound-absorbing duct structure of FIG. 10A;

FIG. 12A is a longitudinal sectional view of the sound-absorbing duct structure of Example 5 according to the present invention, in a state to be set in the measurement system of FIG. 7;

FIG. 12B is a vertical sectional view of the sound-absorbing duct structure of FIG. 12A;

FIG. 12C is a fragmentary sectional view of the sound-absorbing duct structure of FIG. 12A;

FIG. 13A is a longitudinal sectional view of the sound-absorbing duct structure of Example 6 according to the present invention, in a state to be set in the measurement system of FIG. 7;

FIG. 13B is a vertical sectional view of the sound-absorbing duct structure of FIG. 13A;

FIG. 13C is a fragmentary sectional view of the sound-absorbing duct structure of FIG. 13A;

FIG. 14A is a longitudinal sectional view of the sound-absorbing duct structure of Example 7 according to the present invention, in a state to be set in the measurement system of FIG. 7;

FIG. 14B is a vertical sectional view of the sound-absorbing duct structure of FIG. 14A;

FIG. 14C is a fragmentary sectional view of the sound-absorbing duct structure of FIG. 14A;

DETAILED DESCRIPTION OF THE INVENTION

Figure 1B:
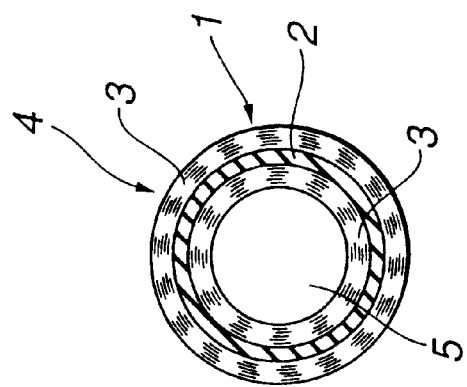
FIG. 1B is a vertical sectional view of the sound-absorbing duct structure of FIG. 1A.

According to the present invention, a sound-absorbing or insulating duct structure comprises a sound-absorbing section arranged in communication with a gas passage. The sound-absorbing section includes a piezoelectric material (piezoelectric layer or film) exhibiting a piezoelectric effect, and an electrically conductive material (electrically conductive layer or electrically conductive sound-absorbing material) in contact with the piezoelectric material. Any cross-sectional shape (in a plane perpendicular to the axis of the duct) is usable for the duct, and therefore the duct has a circular, rectangular or oval cross-sectional shape, or the like. It is sufficient that the duct forms thereinside the gas passage through which a gas flow. Additionally, the sound-absorbing section (including the piezoelectric material and the electrically conductive material) itself may constitute the sound-absorbing duct structure, may constitute a part of a duct formed of other materials, or may be attached to the inner surface of the duct.

With the above sound-absorbing duct structure, first the piezoelectric material is vibrated by sound pressure generated by flow of the gas through the gas passage thereby generating electric charge under the piezoelectric effect. Then, such electric charge is supplied to or consumed by the electrically conductive material. As a result, the sound-absorbing duct structure can effectively reduce noise generated under flow of the gas in the gas passage, particularly noise in a relatively low frequency range which noise can be difficult to be reduced in conventional techniques.

Preferably, the sound-absorbing duct structure comprises a duct which defines thereinside the gas passage through which a gas flows. A first part of the duct is formed with a plurality of small holes. A first expanded duct section is formed around the first part of the duct so as to define therein an inside space which is in communication with the gas passage through the small holes. The inside space has a cross-sectional area larger than that of the gas passage. A first sound-absorbing section is disposed in at least a part of the inside space of the first expanded duct section. The first sound absorbing section includes the piezoelectric material exhibiting the piezoelectric effect, and the electrically conductive material in contact with the piezoelectric material.

It will be understood that any cross-sectional shape (in a plane perpendicular to the axis of the duct) is usable for the duct, and therefore the duct has circular, rectangular or oval cross-sectional shape, or the like. It is sufficient that the duct forms thereinside the gas passage through which a gas flow. Additionally, any cross-sectional shape (in a plane perpendicular to the axis of the duct) is usable for the expanded duct section, and therefore the expanded duct section has circular, rectangular or oval cross-sectional shape, or the like. It is sufficient that the cross-sectional area is enlarged in the expanded duct section as compared with that in the duct. No restriction is applied to the relationship in cross-sectional shape between the duct and the expanded duct section, so that it is permissible that, for example, the duct is circular in cross-section while the expanded duct section is in a shape other than the circular shape. Accordingly, the expanded duct section may have an axis which is not aligned with the axis of the duct. It is permissible that the axis of the expanded duct section is largely separate from the axis of the duct in such a manner that a part of the outer peripheral surface of the expanded duct section is aligned with a part of the outer peripheral surface of the duct.

Further, the inside space of the expanded duct section may not be filled with the sound-absorbing section including the piezoelectric material and the electrically conductive material. In other words, a layer of a gas such as air may be formed in the inside space of the expanded duct section. Otherwise, a layer of a sound-absorbing material such non-woven fabric constituted of polyester fiber or the like may be formed in the inside space of the expanded duct section.

Preferably, at least one cavity type resonator is connected to the duct and in communication with the gas passage, the cavity type resonator being arranged to have a resonant frequency which is set to attenuate noise in the duct. More preferably, the resonant frequency is set to attenuate noise generated by a resonance newly produced, in a certain frequency range, under an acoustically changing effect of the first sound-absorbing section, the resonant frequency being set at a frequency within the certain frequency range. It is to be noted that the cavity type resonator can attenuate the noise generated by the newly produced resonance, in order to reduce noise in the duct to at least a level obtained without the first sound-absorbing section.

Here, it will be understood that a sound transmission loss TL of the above cavity type resonator can be theoretically calculated by using the following equation upon modeling elements for sound attenuation:

$$TL = 10 \cdot \log |1 + \{½ (m-1/m) \sin^2 kL\}^2|$$

where m is an expansion-ratio of inner diameter (the inner diameter of the expanded duct section/the inner diameter of the duct); k is a wavelength constant ($k = 2\pi f/C$ where f is a frequency; and C is sonic velocity); and L is a length of the expanded duct section.

The, above makes it possible to design and produce the cavity type resonator whose resonant frequency is set at an objective frequency.

Preferably, a neck section of the cavity type resonator is provided with the sound-absorbing section (including the piezoelectric material and the electrically conductive material) and/or a sound-absorbing fabric or the like constituted of polyester fiber or the like. Installation of the sound-absorbing section and/or sound-absorbing fabric to the neck section seems to be difficult in operation, and therefore such installation may be limited to a case where raising sound-absorbing performance is eagerly desired.

Preferably, the sound-absorbing duct structure is provided with at least one additional (a second) expanded duct section formed around a second part of the duct. The second part is formed with a plurality of small holes. The second expanded duct section defines therein an inside space which is in communication with the gas passage through the small holes. The inside space has a cross-sectional area larger than that of the gas passage. Additionally, at least one additional (a second) sound-absorbing section disposed in at least a part of the inside space of the expanded duct section. The second sound absorbing section includes an piezoelectric material exhibiting a piezoelectric effect, and an electrically conductive material in contact with the piezoelectric material. The second sound-absorbing section is located and arranged to attenuate noise in the duct. It is preferable that the second sound-absorbing section is located and arranged to attenuate noise generated by a resonance newly produced, in a certain frequency range, under an acoustically changing effect of the first sound-absorbing section. The sound-absorbing section is located and arranged corresponding to a frequency within the certain frequency range. It is to be noted that the cavity type resonator can attenuate the noise generated by the newly produced resonance, in order to reduce noise in the duct to at least a level obtained without the first sound-absorbing section.

Preferably, the piezoelectric material includes a plurality of piezoelectric layers, while the electrically conductive material includes a plurality of electrically conductive layers. Each piezoelectric layer is interposed between the adjacent two electrically conductive layers so as to form a laminated structure of the piezoelectric layers and the electrically conductive layers. This arrangement increases the amount of relatively expensive piezoelectric material; however, it is very effective to raise a sound-absorbing effect. It is preferable that the adjacent two piezoelectric layers are formed different in direction of polarization of piezoelectricity in a direction of thickness of each piezoelectric layer. In this case, the same positive- or negative) electric charge is generated at the facing surfaces of the two adjacent piezoelectric layers which are arranged to be different in the polarization direction of piezoelectricity. This minimizes the amount of deformation of the piezoelectric layers thereby reducing noise generated by the piezoelectric layers themselves.

Preferably, the electrically conductive material has a volume resistivity ranging from 10 to 100000 Ω·cm. If the volume resistivity is lower than 10 Ω·cm, there may be a tendency to lower a vibration suppression effect because the amount of absorption or consumption of electric energy converted by the piezoelectric material is decreased. Even if the volume resistivity is higher than 100000 Ω·cm, there may be a tendency to lower the vibration suppression effect because the amount of absorption or consumption of electric energy converted by the piezoelectric material is decreased.

Preferably, the electrically conductive material is a fabric which is mainly constituted of carbon fiber, or a mixture of carbon fiber and binder fiber made of a thermoplastic resin. The fabric is a woven fabric, a non-woven fabric or the like. The electrically conductive material of the form of fabric can exhibit a high sound-absorbing characteristics thereby effectively reducing noise from the duct. Particularly in case that the electrically conductive material is mainly constituted of the carbon fiber and the binder fiber formed of the thermoplastic resin, the electrically conductive material can not only exhibit the high sound-absorbing characteristics but also obtain a desired volume resistivity by selecting a mixing ratio between the carbon fiber and the binder fiber. This facilitates design of the sound-absorbing duct structure thereby to provide a high performance sound-absorbing duct structure, and can reduce the amount of the carbon fiber to be used thereby to provide a sound-absorbing duct structure at a low cost.

Preferably, the piezoelectric material is a piezoelectric film formed of a plastic. In this regard, the electrically conductive material can be thinned or formed into a thin film because of being made of the plastic, so that it is formed flexible. This facilitates treatment of the sound-absorbing duct structure thereby improving an operational efficiency during installation or the like of the sound-absorbing duct structure, thus providing economical advantages for production process and the like.

Preferably, the piezoelectric material is a film formed of polyvinylidene fluoride and subjected to a poling treatment or piezoelectric treatment which provides to the polyvinylidene fluoride film a characteristics to exhibit a piezoelectric effect. The piezoelectric material of the form of film is facilitated in treatment. Additionally, the polyvinylidene fluoride is advantageous in a point to be readily supplied with a characteristics to exhibit a piezoelectric effect under the effect of the molecular structure thereof, and in another point to be readily available in the market.

Hereinafter, embodiments of the sound-absorbing duct structure 1 according to the present invention will be discussed.

Figure 1C:
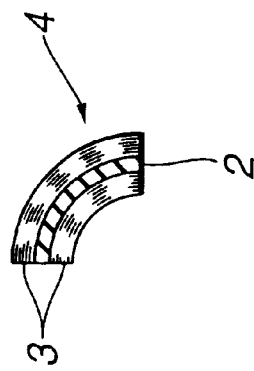
FIG. 1C is a fragmentary sectional view of the sound-absorbing duct structure of FIG. 1.
Figure 1A:
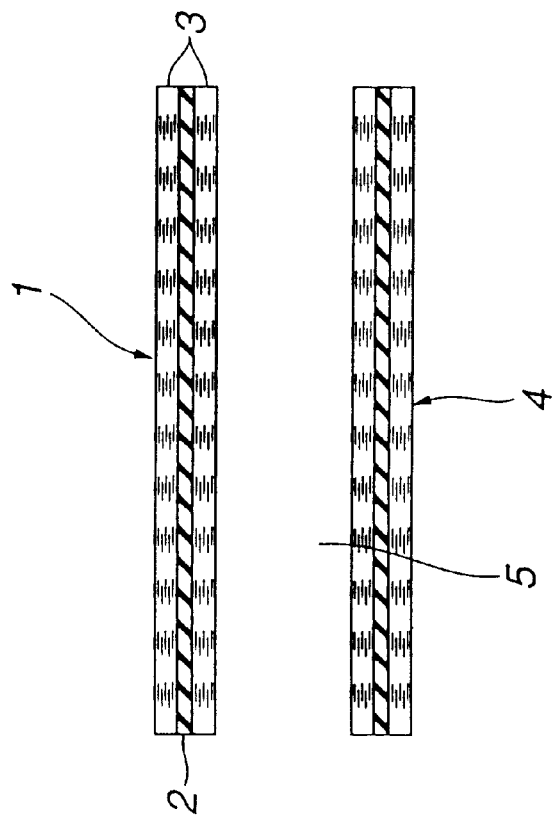
FIG. 1A is a longitudinal sectional view of a first embodiment of a sound-absorbing duct structure according to the present invention.

Referring now to FIGS. 1A to 1C, an embodiment of a sound-absorbing duct structure according to the present invention is illustrated by the reference numeral 1. The sound-absorbing duct 1 comprises a cylindrical piezoelectric film (piezoelectric layer or material) 2 formed of polyvinylidene fluoride (PVDF) which has been subjected to the piezoelectric treatment. The piezoelectric film 2 is interposed between cylindrical electrically conductive layers (electrically conductive material or sound-absorbing material) 3, 3 which are formed of carbon fiber. In other words, the inner electrically conductive layer 3, the piezoelectric film 2, the outer electrically conductive layer 3 are successively laminated to form a laminated cylindrical structure which serves as a cylindrical sound-absorbing section or structure 4. The sound-absorbing section 4 serving as the sound-absorbing duct structure 1 is formed thereinside a gas passage 5 through which gas flows. The piezoelectric film 2 has been prepared by causing a film of PVDF to be subjected to the piezoelectric or poling treatment for providing a characteristics exhibiting an piezoelectric effect, to the PVDF film. Such piezoelectric treatment is disclosed in Japanese Patent Publication No. 50-40720. The piezoelectric film (PVDF) is available from Kureha Chemical Industry Co., Ltd. in Japan under the trade name of "KF Piezo Film".

Thus, the sound-absorbing duct structure 1 shown in FIG. 1 is constituted of the piezoelectric film 2 exhibiting the piezoelectric effect, and the electrically conductive layer 3 having an electrical conductivity. Accordingly, in operation, first the piezoelectric film 2 is vibrated by sound pressure generated by flow of the gas through the gas passage 5 thereby generating electric charge under the piezoelectric effect. Then, such electric charge is supplied to or consumed by the electrically conductive layers 3. As a result, noise generated under flow of the gas in the gas passage 5 can be effectively attenuated.

FIGS. 2A to 2C illustrates a second embodiment of the sound-absorbing duct structure 1 according to the present invention, similar to the first embodiment. In this embodiment, the sound-absorbing duct structure comprises a duct 6 which is formed with an expanded duct section 6d which is generally cylindrical and extends along the axis of the duct 6. The expanded duct section 6d is coaxial with the duct 6 and formed around the gas passage 5. The inside of the expanded duct section 6d is communicated with the gas passage 5 through a plurality of small holes 6h. The generally cylindrical sound-absorbing section 4 similar to that of the first embodiment is disposed inside the expanded duct section 6d, and includes the cylindrical piezoelectric film 2 formed of polyvinylidene fluoride (PVDF) which has been subjected to the piezoelectric treatment. The piezoelectric film 2 is interposed between cylindrical electrically conductive layers 3, 3 which are formed of carbon fiber. The inner electrically conductive layer 3, the piezoelectric film 2, the outer electrically conductive layer 3 are-successively laminated to form a laminated cylindrical structure.

Thus, the sound-absorbing duct structure 1 shown in FIG. 2 is provided with the sound-absorbing section 4 which is constituted of the piezoelectric film 2 exhibiting the piezoelectric effect, and the electrically conductive layer 3 having an electrical conductivity. Accordingly, first the piezoelectric film 2 is vibrated by sound pressure generated by flow of the gas through the gas passage 5 thereby generating electric charge under the piezoelectric effect. Then, such electric charge is supplied to or consumed by the electrically conductive layers 3. As a result, noise generated under flow of the gas in the gas passage 5 can be effectively reduced. Besides, since a part of the gas passage 5 is communicated through the small holes 6*h* with the sound-absorbing section 6*d* fitted in the expanded duct section 6*d*, it is made possible to select the position of the sound-absorbing section 6*d* so as to correspond to the position of antinode of objective sound pressure generated in the gas passage 5. As a result, noise generated under flow of the gas in the gas passage 5 can be effectively reduced.

FIGS. 3A to 3C illustrate a third embodiment of the sound-absorbing duct structure 1 according to the present invention, similar to the second embodiment with the exception that a resonator 7 is additionally provided to the sound absorbing duct structure 1. More specifically, the resonator 7 includes a chamber section 7*m* which is connected through its neck section 7*n* to the duct 6 so that the gas passage 5 is in communication with the inside of the chamber section 7*m* through the neck section 7*n*. In this embodiment, the sound-absorbing duct structure 1 comprises a duct 6 which is formed with an expanded duct section 6*d* which is generally cylindrical and extends along the axis of the duct 6. The expanded duct section 6*d* is coaxial with the duct 6 and formed around the gas passage 5. The inside of the expanded duct section 6*d* is communicated with the gas passage 5 through a plurality of small holes 6*h*. The generally cylindrical sound-absorbing section 4 similar to that of the first embodiment is disposed inside the expanded duct section 6*d*, and includes the cylindrical piezoelectric film 2 formed of polyvinylidene fluoride (PVDF) which has been subjected to the piezoelectric treatment. The piezoelectric film 2 is interposed between cylindrical electrically conductive layers 3, 3 which are formed of carbon fiber. The inner electrically conductive layer 3, the piezoelectric film 2, the outer electrically conductive layer 3 are successively laminated to form a laminated cylindrical structure.

As discussed above, the sound-absorbing duct structure 1 shown in FIG. 2 is provided with the sound-absorbing section 4 which is constituted of the piezoelectric film 2 exhibiting the piezoelectric effect, and the electrically conductive layer 3 having an electrical conductivity. Accordingly, in operation, first the piezoelectric film 2 is vibrated by sound pressure generated by flow of the gas through the gas passage 5 thereby generating electric charge under the piezoelectric effect. Then, such electric charge is supplied to or consumed by the electrically conductive layers 3. As a result, noise generated under flow of the gas in the gas passage 5 can be effectively attenuated. Besides, since a part of the gas passage 5 is communicated through the small holes 6*h* with the sound-absorbing section 6*d* fitted in the expanded duct section 6*d*, it is made possible to select the position of the sound-absorbing section 6*d* so as to correspond to the position of objective antinode of sound pressure generated in the gas passage 5. As a result, noise generated under flow of the gas in the gas passage 5 can be effectively reduced. Under the action of the sound-absorbing section 4, newly formed antinode of sound pressure appears in the gas passage 5. Accordingly, although objective or set frequencies can be attenuated, resonance of frequencies near the set frequencies newly occurs under reflection. However, noise generated by such newly occurring resonance can be damped by the resonator 7. As a result, noise generated under flow of the gas in the gas passage 5 can be effectively reduced without any disadvantages.

FIGS. 4A to 4C illustrate a fourth embodiment of the sound-absorbing duct structure 1 according to the present invention, similar to the second embodiment with the exception that another sound-absorbing section 4' is disposed in another expanded duct section 6*d*. In this embodiment, the sound-absorbing duct structure comprises a duct 6 which is formed with an expanded duct section 6*d* which is generally cylindrical and extends along the axis of the duct 6. The expanded duct section 6*d* is coaxial with the duct 6 and formed around the gas passage 5. The inside of the expanded duct section 6*d* is communicated with the gas passage 5 through a plurality of small holes 6*h*. The generally cylindrical sound-absorbing section 4 similar to that of the first embodiment is disposed inside the expanded duct section 6*d*, and includes the cylindrical piezoelectric film 2 formed of polyvinylidene fluoride (PVDF) which has been subjected to the piezoelectric treatment. The piezoelectric film 2 is interposed between cylindrical electrically conductive layers 3, 3 which are formed of carbon fiber. The inner electrically conductive layer 3, the piezoelectric film 2, the outer electrically conductive layer 3 are successively laminated to form a laminated cylindrical structure. Additionally, an additional expanded duct section 6*d*' is formed in the duct 6 and connected in series with the expanded duct section 6*d*. An additional sound-absorbing section 4' identical with that 4 in the expanded duct section 6*d* is disposed inside the additional expanded duct section 6*d*'.

As discussed above, the sound-absorbing duct structure 1 shown in FIG. 2 is provided with the sound-absorbing section 4 which is constituted of the piezoelectric film 2 exhibiting the piezoelectric effect, and the electrically conductive layer 3 having an electrical conductivity. Accordingly, in operation, first the piezoelectric film 2 is vibrated by sound pressure generated by flow of the gas through the gas passage 5 thereby generating electric charge under the piezoelectric effect. Then, such electric charge is supplied to or consumed by the electrically conductive layers 3. As a result, noise generated under flow of the gas in the gas passage 5 can be effectively attenuated. Besides, since a part of the gas passage 5 is communicated through the small holes 6*h* with the sound-absorbing section 6*d* fitted in the expanded duct section 6*d*, it is made possible to select the position of the sound-absorbing section 6*d* so as to correspond to the position of antinode of objective sound pressure generated in the gas passage 5. As a result, noise generated under flow of the gas in the gas passage 5 can be effectively reduced. Under the action of the first sound-absorbing section 4, newly formed antinode of sound pressure appears in the gas passage 5. Accordingly, although objective or set frequencies can be attenuated, resonance of frequencies near the set frequencies newly occurs under reflection. However, noise generated by such newly occurring resonance can be effectively damped by the newly disposed second sound-absorbing section 4'. As a result, noise generated under flow of the gas in the gas passage 5 can be effectively reduced without any disadvantages.

Figure 5A:
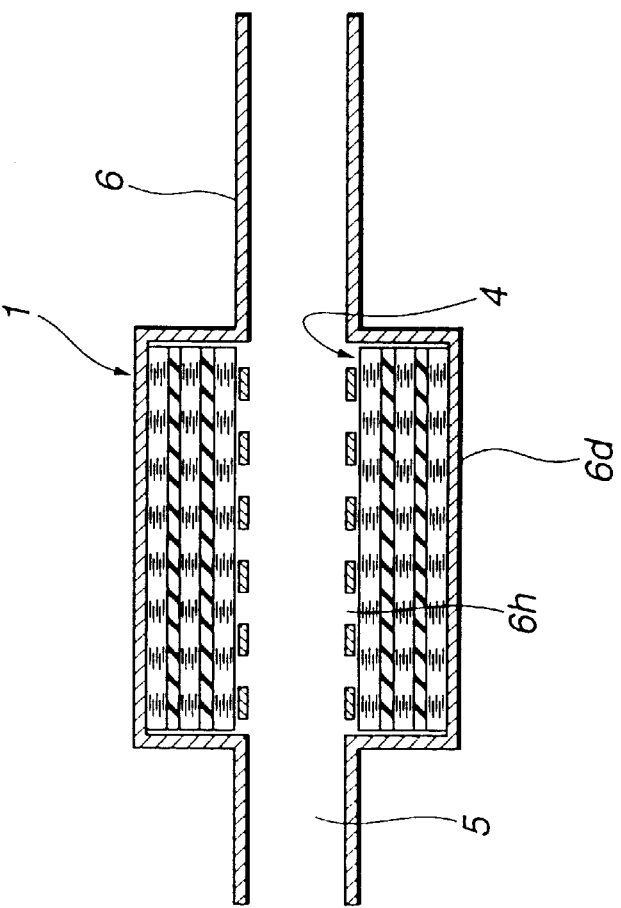
FIG. 5A is a longitudinal sectional view of a fifth embodiment of the sound-absorbing duct structure according to the present invention.
Figure 5B:
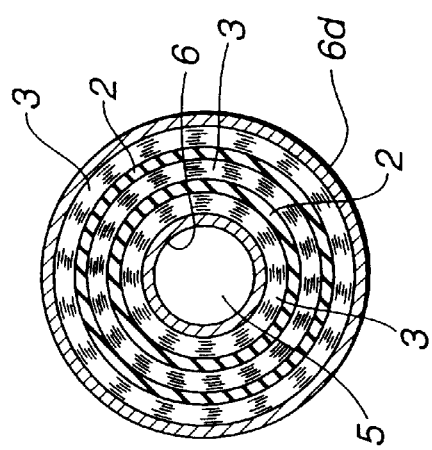
FIG. 5B is a vertical sectional view of the sound-absorbing duct structure of FIG. 5A.
Figure 5C:
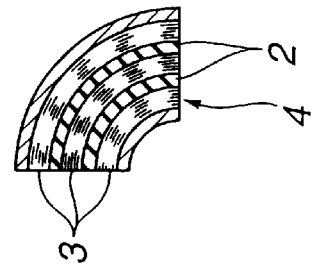
FIG. 5C is a fragmentary sectional view of the sound-absorbing duct structure of FIG. 5A.

FIGS. 5A to 5C illustrate a fifth embodiment of the sound-absorbing duct structure 1 according to the present invention, similar to the second embodiment. In this embodiment, the sound-absorbing duct structure 1 comprises a duct 6 which is formed with an expanded duct section 6d which is generally cylindrical and extends along the axis of the duct 6. The expanded duct section 6d is coaxial with the duct 6 and formed around the gas passage 5. The inside of the expanded duct section 6d is communicated with the gas passage 5 through a plurality of small holes 6h. The generally cylindrical sound-absorbing section 4 is disposed inside the expanded duct section 6d, and includes two cylindrical piezoelectric films 2 formed of polyvinylidene fluoride (PVDF) which has been subjected to the piezoelectric treatment. Each piezoelectric film 2 is interposed between the adjacent cylindrical electrically conductive layers 3, 3 which are formed of carbon fiber. The electrically conductive layer 3, the piezoelectric film 2, the electrically conductive layer 3, the piezoelectric film 2 and the electrically conductive layer 3 are successively laminated to form a laminated cylindrical structure.

Thus, the sound-absorbing duct structure 1 shown in FIG. 5A to 5C is provided with the sound-absorbing section 4 which is constituted of the piezoelectric films 2 exhibiting the piezoelectric effect, and the electrically conductive layers 3 having an electrical conductivity. Accordingly, in operation, first the piezoelectric films 2 are vibrated by sound pressure generated by flow of the gas through the gas passage 5 thereby generating electric charge under the piezoelectric effect. Then, such electric charge is supplied to or consumed by the electrically conductive layers 3. As a result, noise generated under flow of the gas in the gas passage 5 can be effectively reduced. It will be understood that the two piezoelectric films 2 are used in this embodiment, and therefore the sound pressure of noise can be further effectively attenuated as compared with a sound-absorbing duct structure using a single piezoelectric film 2.

Figure 6B:
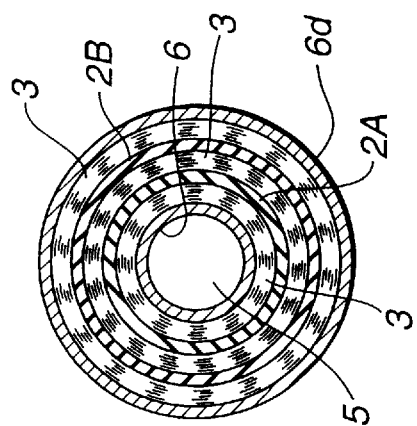
FIG. 6B is a vertical sectional view of the sound-absorbing duct structure of FIG. 6A.
Figure 6C:
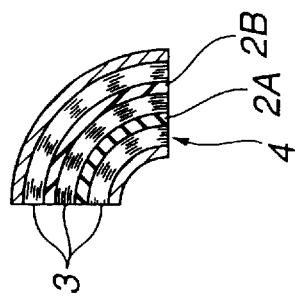
FIG. 6C is a fragmentary sectional view of the sound-absorbing duct structure of FIG. 6A.
Figure 6A:
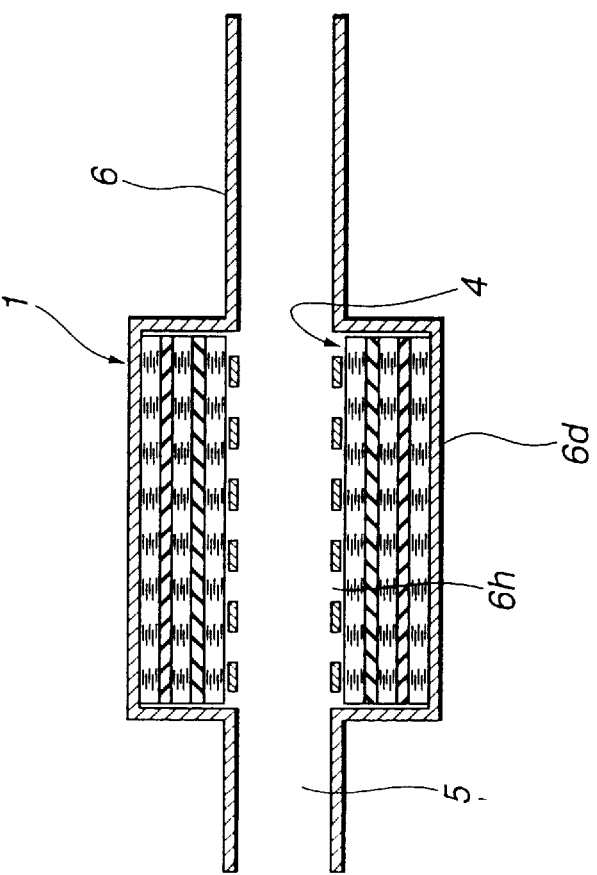
FIG. 6A is a longitudinal sectional view of a sixth embodiment of the sound-absorbing duct structure according to the present invention.

FIGS. 6A to 6C illustrate a sixth embodiment of the sound-absorbing duct structure 1 according to the present invention, similar to the fifth embodiment with the exception that two piezoelectric films 2A, 2B are different in direction of polarization of piezoelectricity in a direction of thickness of each piezoelectric film. In this embodiment, the sound-absorbing duct structure comprises a duct 6 which is formed with an expanded duct section 6d which is generally cylindrical and extends along the axis of the duct 6. The expanded duct section 6d is coaxial with the duct 6 and formed around the gas passage 5. The inside of the expanded duct section 6d is communicated with the gas passage 5 through a plurality of small holes 6h. The generally cylindrical sound-absorbing section 4 is disposed inside the expanded duct section 6d, and includes the two cylindrical piezoelectric films 2A, 2B formed of polyvinylidene fluoride (PVDF). The piezoelectric films 2A, 2B are formed by causing a film of polyvinylidene fluoride and another film of polyvinylidene fluoride to undergo respectively a first piezoelectric treatment (poling) and a second piezoelectric treatment (poling) which are different in direction of polarization of piezoelectricity in the direction of thickness of each film. Each piezoelectric film 2A, 2B is interposed between the adjacent cylindrical electrically conductive layers 3, 3 which are formed of carbon fiber. The electrically conductive layer 3, the piezoelectric film 2A, the electrically conductive layer 3, the piezoelectric film 2B and the electrically conductive layer 3 are successively laminated to form a laminated cylindrical structure.

As mentioned above, the sound-absorbing duct structure 1 shown in FIGS. 6A to 6B is provided with the sound-absorbing section 4 which is constituted of the piezoelectric films 2 exhibiting the piezoelectric effect, and the electrically conductive layers 3 having an electrical conductivity. Accordingly, in operation, first the piezoelectric films 2 are vibrated by sound pressure generated by flow of the gas through the gas passage 5 thereby generating electric charge under the piezoelectric effect. Then, such electric charge is supplied to or consumed by the electrically conductive layers 3. As a result, noise generated under flow of the gas in the gas passage 5 can be effectively attenuated. It will be understood that the two piezoelectric films 2A, 2B are used in this embodiment, and therefore the sound pressure of noise can be further effectively attenuated as compared with a sound-absorbing duct structure using a single piezoelectric film 2. Additionally, since the piezoelectric films 2A, 2B are different in direction of polarization of piezoelectricity in the thickness direction, an electrostatic repulsion is generated between the outer surface-side of the piezoelectric film 2A and the inner surface-side of the piezoelectric film 2B which are the same (positive or negative) in electric charge. Consequently, even noise caused by deformation of the piezoelectric films 2A, 2B can effectively reduced as compared with a case where two piezoelectric films are the same in direction of polarization of piezoelectricity in a thickness direction of the piezoelectric film.

The following examples are included merely to aid the understanding of the invention, and variations may be made by one skilled in the art without departing from the spirit and scope of the invention.

EXAMPLES 1 to 11, COMPARATIVE EXAMPLES 1 to 3, and REFERENCE 1

Figure 7:
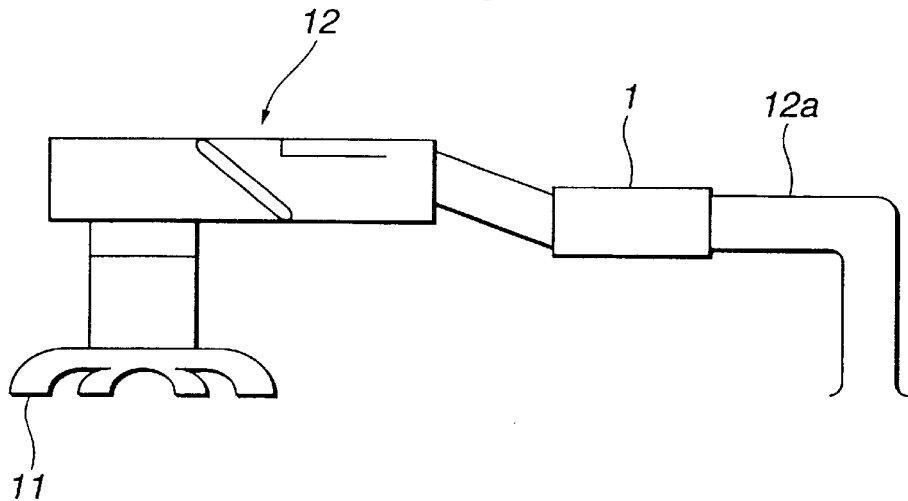
FIG. 7 is an explanatory view showing a measurement system for measuring a noise reduction characteristics of the sound-absorbing duct structure of Examples, Comparative Examples and Reference.

Each sound-absorbing duct structure of Examples 1 to 11, Comparative Examples 1 to 3 and Reference 1 underwent a measurement of a noise reduction characteristics under the following test by using a measurement system shown in FIG. 7: The sound-absorbing duct structure 1 was installed to an air intake duct 12a (having an inner diameter of about 5 cm) of an air cleaner 12 in such a manner that the air passage (5) of the sound-absorbing duct structure was aligned with the intake duct 12a. The air cleaner 12 forms part of an intake system including an intake manifold 11, of a four-cylinder internal combustion engine which was set in a so-called simi-anechoic room, though not shown. In the test, measurement of insertion loss (IL) was conducted, in which the insertion loss was a difference between a sound pressure at a location (between the intake manifold 11 and the air cleaner 12) downstream of the sound-absorbing duct structure 1 and a location (the upstream end portion of the air intake duct 12a) upstream of the sound-absorbing duct structure 1. The difference in sound pressure (dB) between the upstream and downstream locations was measured at various frequencies to obtain measured values. The measured values in a low frequency range lower than 300 Hz were averaged to obtain an averaged insertion loss shown in Table 1. The measured values in a medium frequency range of from 300 to 1 kHz were averaged to obtain an averaged insertion loss shown in Table 1. The measured values in a high frequency range higher than 1 kHz were averaged to obtain an averaged insertion loss shown in Table 1. Thus, measurement results are shown in Table 1.

Example 1

Figure 8A:
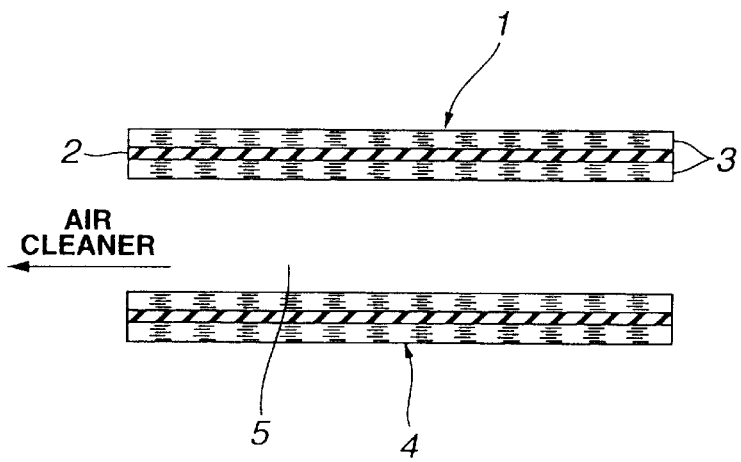
FIG. 8A is a longitudinal sectional view of the sound-absorbing duct structure of Example 1 according to the present invention, in a state to be set in the measurement system of FIG. 7.
Figure 8B:
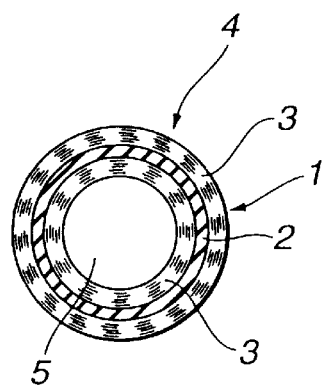
FIG. 8B is a vertical sectional view of the sound-absorbing duct structure of FIG. 8A.
Figure 8C:
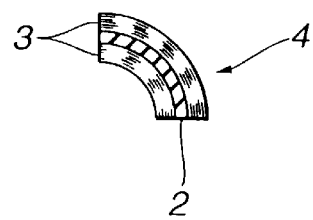
FIG. 8C is a fragmentary sectional view of the sound-absorbing duct structure of FIG. 8A.

The sound-absorbing duct structure 1 of Example 1 shown in FIGS. 8A to 8C comprised a cylindrical piezoelectric film 2 formed of polyvinylidene fluoride (PVDF) which had been subjected to the piezolectric treatment. The piezoelectric film 2 had the generally same inner diameter as the air intake duct 12a of the air cleaner 12, and was interposed between cylindrical electrically conductive layers 3, 3. Each electrically conductive layer 3 was constituted of a non-woven fabric (sound-absorbing material) of carbon fiber, and had a volume resistivity of 100 Ω·cm. In other words, the inner electrically conductive layer 3, the piezoelectric film 2, the outer electrically conductive layer 3 were successively laminated to form a laminated cylindrical structure which serves as a cylindrical sound-absorbing section or structure 4. The sound-absorbing section 4 serving as the sound-absorbing duct structure 1 was formed thereinside a gas passage 5 through which gas flows. The thus prepared sound-absorbing duct structure 1 had a length of 20 cm and was subjected to the measurement of the noise reduction characteristics.

Example 2

The sound-absorbing duct structure 1 of Example 2 shown in FIGS. 9A to 9C comprised a duct 6 (having an inner diameter of about 5 mm) which was formed with an expanded duct section 6d which is generally cylindrical and extends along the axis of the duct 6. The expanded duct section 6d was coaxial with the duct 6 and formed around the gas passage 5 so as to have an axial length of about 20 cm. The expanded duct section 6d had an expansion ratio of 1.5, in which the expansion ratio was represented by [the inner diameter of the expanded duct section 6d/the inner diameter of the duct 6]. The inside of the expanded duct section 6d was communicated with the gas passage 5 through a plurality of small holes 6h. The generally cylindrical sound-absorbing section 4 similar to that of Example 1 was disposed inside the expanded duct section 6d, and includes the cylindrical piezoelectric film 2 formed of polyvinylidene fluoride (PVDF) which had been subjected to the piezolectric treatment. The piezoelectric film 2 was interposed between cylindrical electrically conductive layers 3, 3 which were formed of carbon fiber. In other words, the inner electrically conductive layer 3, the piezoelectric film 2, the outer electrically conductive layer 3 were successively laminated to form a laminated cylindrical structure. Each electrically conductive layer 3 was constituted of a non-woven fabric (sound-absorbing material) of carbon fiber, and had a volume resistivity of 100 Ω·cm. The thus prepared sound-absorbing duct structure 1 was subjected to the measurement of the noise reduction characteristics.

Example 3

The sound-absorbing duct structure 1 of Example 3 shown in FIGS. 10A to 10C comprised a duct 6 (having an inner diameter of about 5 mm) which was formed with an expanded duct section 6d which was generally cylindrical and extends along the axis of the duct 6. The expanded duct section 6d was coaxial with the duct 6 and formed around the gas passage 5 so as to have an axial length of about 20 cm. The expanded duct section 6d had an expansion ratio of 1.5, in which the expansion ratio was represented by [the inner diameter of the expanded duct section 6d/the inner diameter of the duct 6]. The inside of the expanded duct section 6d was communicated with the gas passage 5 through a plurality of small holes 6h. The generally cylindrical sound-absorbing section 4 similar to that of Example 1 was disposed inside the expanded duct section 6d, and includes the cylindrical piezoelectric film 2 formed of polyvinylidene fluoride (PVDF) which had been subjected to the piezolectric treatment. The piezoelectric film 2 was interposed between cylindrical electrically conductive layers 3, 3 which were formed of carbon fiber. In other words, the inner electrically conductive layer 3, the piezoelectric film 2, the outer electrically conductive layer 3 were successively laminated to form a laminated cylindrical structure. Each electrically conductive layer 3 was constituted of a non-woven fabric (sound-absorbing material) of carbon fiber, and had a volume resistivity of 100 Ω·cm. In this example, the sound-absorbing section 4 was disposed inside the expanded duct section 6d in such a manner as to form an annular space 8 around the sound-absorbing section 4, in which the outer diameter of the sound-absorbing section 4 was 1.25 times of the inner diameter of the duct 6. The thus prepared sound-absorbing duct structure 1 was subjected to the measurement of the noise reduction characteristics.

Example 4

Figure 11A:
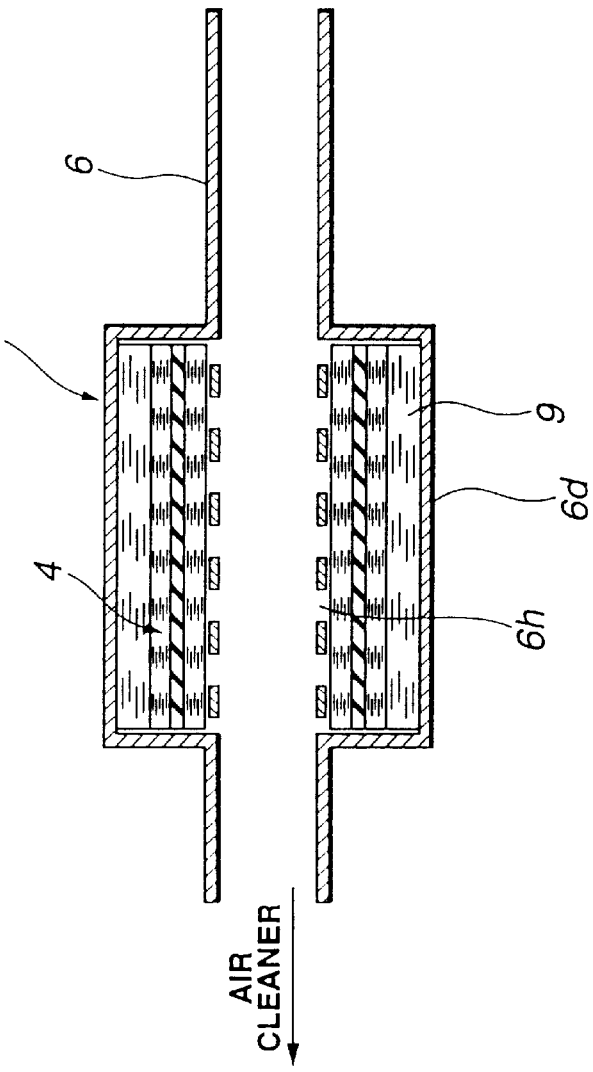
FIG. 11A is a longitudinal sectional view of the sound-absorbing duct structure of Example 4 according to the present invention, in a state to be set in the measurement system of FIG. 7.
Figure 11B:
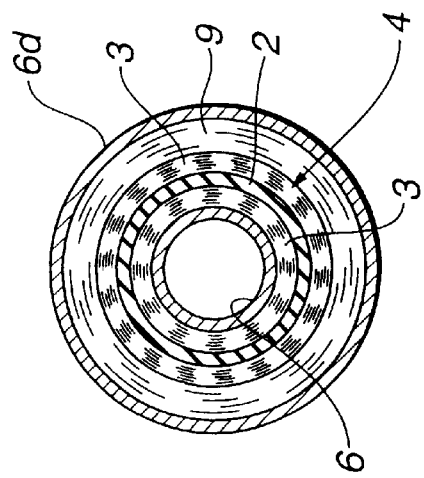
FIG. 11B is a vertical sectional view of the sound-absorbing duct structure of FIG. 11A.
Figure 11C:
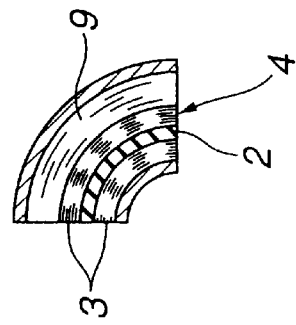
FIG. 11C is a fragmentary sectional view of the sound-absorbing duct structure of FIG. 11A.

The sound-absorbing duct structure 1 of Example 4 shown in FIGS. 11A to 11C comprised a duct 6 (having an inner diameter of about 5 mm) which was formed with an expanded duct section 6d which was generally cylindrical and extends along the axis of the duct 6. The expanded duct section 6d was coaxial with the duct 6 and formed around the gas passage 5 so as to have an axial length of about 20 cm. The expanded duct section 6d had an expansion ratio of 1.5, in which the expansion ratio was represented by [the inner diameter of the expanded duct section 6d/the inner diameter of the duct 6]. The inside of the expanded duct section 6d was communicated with the gas passage 5 through a plurality of small holes 6h. The generally cylindrical sound-absorbing section 4 similar to that of Example 1 was disposed inside the expanded duct section 6d, and includes the cylindrical piezoelectric film 2 formed of polyvinylidene fluoride (PVDF) which had been subjected to the piezolectric treatment. The piezoelectric film 2 was interposed between cylindrical electrically conductive layers 3, 3 which were formed of carbon fiber. In other words, the inner electrically conductive layer 3, the piezoelectric film 2, the outer electrically conductive layer 3 were successively laminated to form a laminated cylindrical structure. Each electrically conductive layer 3 was constituted of a non-woven fabric (sound-absorbing material) of carbon fiber, and had a volume resistivity of 100 Ω·cm. In this example, the sound-absorbing section 4 was disposed inside the expanded duct section 6d in such a manner as to have an outer diameter of 1.25 times of the inner diameter of the duct 6. Additionally, a layer 9 of non-woven fabric (sound-absorbing material) formed of polyester fiber was disposed around the sound-absorbing section 4 and accordingly between the outer surface of the sound-absorbing section 4 and the inner cylindrical surface of the expanded duct section 6d. The non-woven fabric layer 9 had an inner diameter of 1.25 times of the inner diameter of the duct 6 and an outer diameter of 1.5 times of the inner diameter of the duct 6. The thus prepared sound-absorbing duct structure 1 was subjected to the measurement of the noise reduction characteristics.

Example 5

The sound-absorbing duct structure 1 of Example 5 shown in FIGS. 12A to 12C comprised a duct 6 (having an inner diameter of about 5 mm) which was formed with an expanded duct section 6d which is generally cylindrical and extends along the axis of the duct 6. The expanded duct section 6d was coaxial with the duct 6 and formed around the gas passage 5 so as to have an axial length of about 20 cm. The expanded duct section 6d had an expansion ratio of 1.5, in which the expansion ratio was represented by [the inner diameter of the expanded duct section 6d/the inner diameter of the duct 6]. The inside of the expanded duct section 6d was communicated with the gas passage 5 through a plurality of small holes 6h. In this example, a generally cylindrical body B is disposed inside the expanded duct section 6d and included a generally semi-cylindrical sound-absorbing section 4 and a generally semi-cylindrical layer 9 of a sound-absorbing material of non-woven fabric formed of polyester fiber. As shown, the sound-absorbing section 4 and the sound-absorbing material layer 9 occupied respectively upper and lower halves of the inside of the expanded duct section 6d. The sound-absorbing section 4 includes the semi-cylindrical piezoelectric film 2 formed of polyvinylidene fluoride (PVDF) which had been subjected to the piezolectric treatment. The piezoelectric film 2 was interposed between semi-cylindrical electrically conductive layers 3, 3 which were formed of carbon fiber. In other words, the inner electrically conductive layer 3, the piezoelectric film 2, the outer electrically conductive layer 3 were successively laminated to form a laminated semi-cylindrical structure. Each electrically conductive layer 3 was constituted of a non-woven fabric (sound-absorbing material) of carbon fiber, and had a volume resistivity of 100 Ω·cm. The thus prepared sound-absorbing duct structure 1 was subjected to the measurement of the noise reduction characteristics.

Example 6

The sound-absorbing duct structure 1 of Example 6 shown in FIGS. 13A to 13C was identical with that of Example 2 shown in FIGS. 9A to 9C with the exception that a resonator 7 is added to the duct 6. The resonator 7 includes a chamber section 7m which is connected through its neck section 7n to the duct 6 so that the gas passage 5 is in communication with the inside of the chamber section 7m through the neck section 7n. The cross-sectional area of the opening of the neck section 7n was 9 cm². The resonator 7 was set to make a resonance at a frequency of 130 Hz. The thus prepared sound-absorbing duct structure 1 was subjected to the measurement of the noise reduction characteristics.

Example 7

The sound-absorbing duct structure 1 of Example 7 shown in FIGS. 14A to 14C and was similar to that of Example 2 shown in FIGS. 9A to 9C with the exception that an additional sound-absorbing section 4' is disposed in an additional expanded duct section 6d'. Specifically, the additional expanded duct section 6d' is formed in the duct 6 and connected in series with the expanded duct section 6d. The additional expanded duct section 6d' had an axial length of about 10 cm and an expansion ratio of 1.75, in which the expansion ratio was represented by [the inner diameter of the expanded duct section 6d'/the inner diameter of the duct 6]. The expanded duct section 6d' is coaxial with the duct 6 and formed around the gas passage 5. The inside of the expanded duct section 6d' is communicated with the gas passage 5 through a plurality of small holes 6h'. The generally cylindrical sound-absorbing section 4' similar to that of Example 2 is disposed inside the expanded duct section 6d', and includes the cylindrical piezoelectric film 2 formed of polyvinylidene fluoride (PVDF) which had been subjected to the piezolectric treatment. The piezoelectric film 2 was interposed between cylindrical electrically conductive layers 3, 3. In other words, the inner electrically conductive layer 3, the piezoelectric film 2, the outer electrically conductive layer 3 were successively laminated to form a laminated cylindrical structure. Each electrically conductive layer 3 was constituted of a non-woven fabric (sound-absorbing material) of carbon fiber, and had a volume resistivity of 100 Ω·cm. The thus prepared sound-absorbing duct structure 1 was subjected to the measurement of the noise reduction characteristics.

Example 8

Figure 15A:
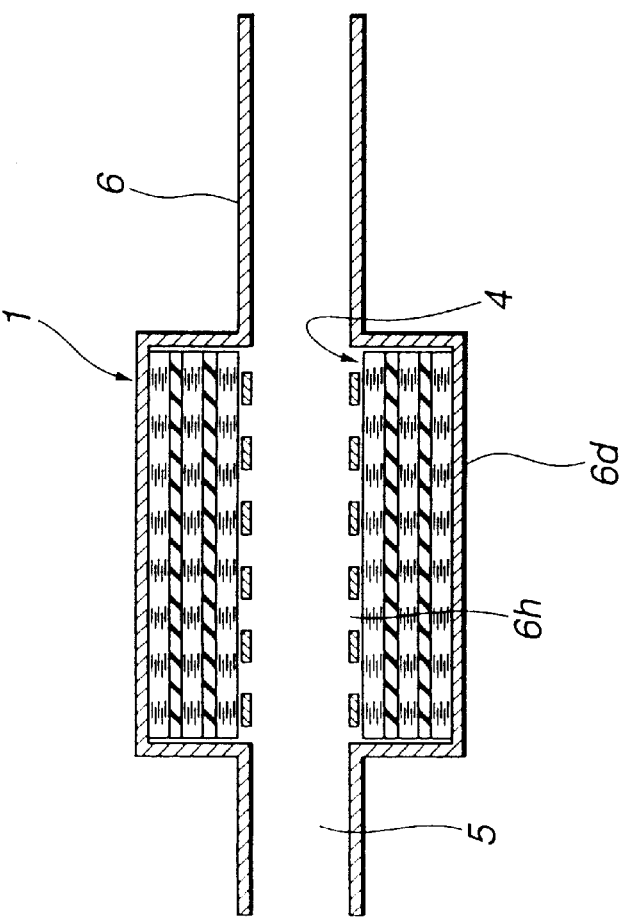
FIG. 15A is a longitudinal sectional view of the sound-absorbing duct structure of Example 8 according to the present invention, in a state to be set in the measurement system of FIG. 7.
Figure 15B:
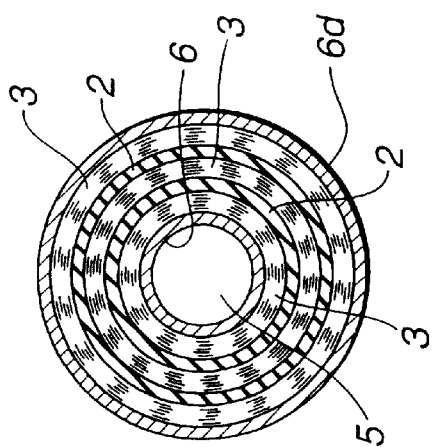
FIG. 15B is a vertical sectional view of the sound-absorbing duct structure of FIG. 15A.
Figure 15C:
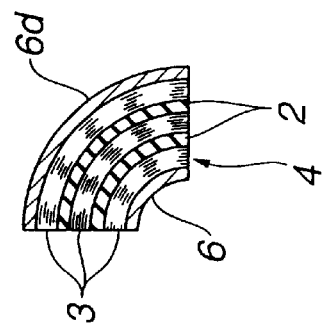
FIG. 15C is a fragmentary sectional view of the sound-absorbing duct structure of FIG. 15A.

The sound-absorbing duct structure 1 of Example 8 shown in FIGS. 15A to 15C was similar to that of Example 2 shown in FIGS. 9A to 9C except for the structure of the sound-absorbing section 4. Specifically, the sound-absorbing duct structure 4 of this Example includes two cylindrical piezoelectric films 2 formed of polyvinylidene fluoride (PVDF) which had been subjected to the piezoelectric treatment. Each piezoelectric film 2 is interposed between the adjacent cylindrical electrically conductive layers 3, 3 each of which was constituted of a non-woven fabric (sound-absorbing material) formed of carbon fiber and had a volume resistivity of 100 Ω·cm. The electrically conductive layer 3, the piezoelectric film 2, the electrically conductive layer 3, the piezoelectric film 2 and the electrically conductive layer 3 are successively laminated to form a laminated cylindrical structure. The thus prepared sound-absorbing duct structure 1 was subjected to the measurement of the noise reduction characteristics.

Example 9

Figure 16A:
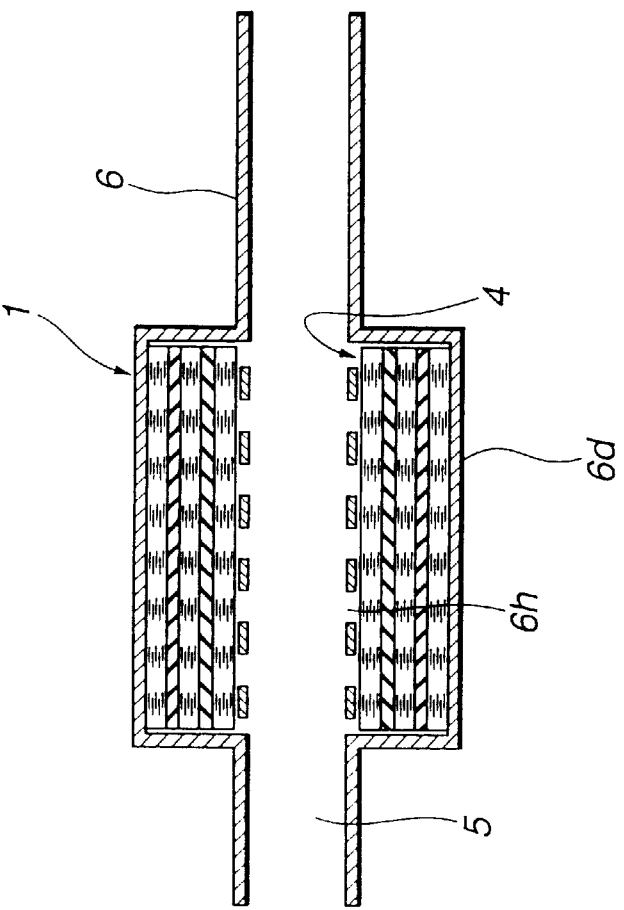
FIG. 16A is a longitudinal sectional view of the sound-absorbing duct structure of Example 9 according to the present invention, in a state to be set in the measurement system of FIG. 7.
Figure 16B:
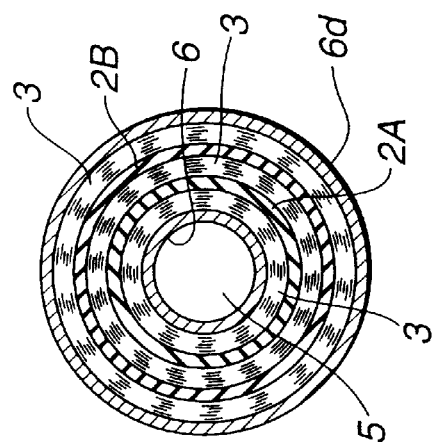
FIG. 16B is a vertical sectional view of the sound-absorbing duct structure of FIG. 16A.
Figure 16C:
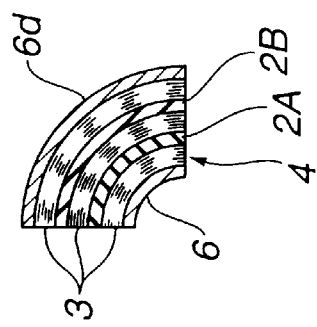
FIG. 16C is a fragmentary sectional view of the sound-absorbing duct structure of FIG. 16A.

The sound-absorbing duct structure 1 of Example 9 shown in FIGS. 16A to 16C was similar to that of Example 8 shown in FIGS. 15A to 15C except for the structure of the sound-absorbing section 4. The sound-absorbing duct structure of this Example included two cylindrical piezoelectric films 2A, 2B formed of polyvinylidene fluoride (PVDF) The piezoelectric films 2A, 2B are formed by causing a film of polyvinylidene fluoride and another film of polyvinylidene fluoride to undergo respectively a first piezoelectric (poling) treatment and a second piezoelectric (poling) treatment which are different in direction of polarization of piezoelectricity in the direction of thickness of each film. Accordingly, the two piezoelectric films 2A, 2B are different in direction of polarization of piezoelectricity in the thickness direction of each piezoelectric film. Each piezoelectric film 2A, 2B is interposed between the adjacent cylindrical electrically conductive layers 3, 3 each of which was constituted of a non-woven fabric (sound-absorbing material) formed of carbon fiber and had a volume resistivity of 100 Ω·cm. The electrically conductive layer 3, the piezoelectric film 2A, the electrically conductive layer 3, the piezoelectric film 2B and the electrically conductive layer 3 are successively laminated to form a laminated cylindrical structure. The thus prepared sound-absorbing duct structure 1 was subjected to the measurement of the noise reduction characteristics.

Example 10

The sound-absorbing duct structure 1 of Example 10 was prepared to be identical with that of Example 2 shown in FIGS. 9A to 9C with the exception that each electrically conductive layer 3 constituted of the non-woven fabric (sound-absorbing material) of carbon fiber had a volume resistivity of 10 Ω·cm, lower than that in Example 2. The thus prepared sound-absorbing duct structure 1 was subjected to the measurement of the noise reduction characteristics.

Example 11

The sound-absorbing duct structure 1 of Example 11 was prepared to be identical with that of Example 2 shown in FIGS. 9A to 9C with the exception that each electrically conductive layer 3 constituted of the non-woven fabric (sound-absorbing material) of carbon fiber had a volume resistivity of 100000 Ω·cm, higher than that in Example 2. The thus prepared sound-absorbing duct structure 1 was subjected to the measurement of the noise reduction characteristics.

Comparative Example 1

The sound-absorbing duct structure of Comparative Example 1 was prepared to be identical with that of Example 2 shown in FIGS. 9A to 9C with the exception that each electrically conductive layer 3 constituted of the non-woven fabric (sound-absorbing material) of carbon fiber had a volume resistivity of 5 Ω·cm, lower than that in Example 10. The thus prepared sound-absorbing duct structure 1 was subjected to the measurement of the noise reduction characteristics.

Reference 1

Figure 17B:
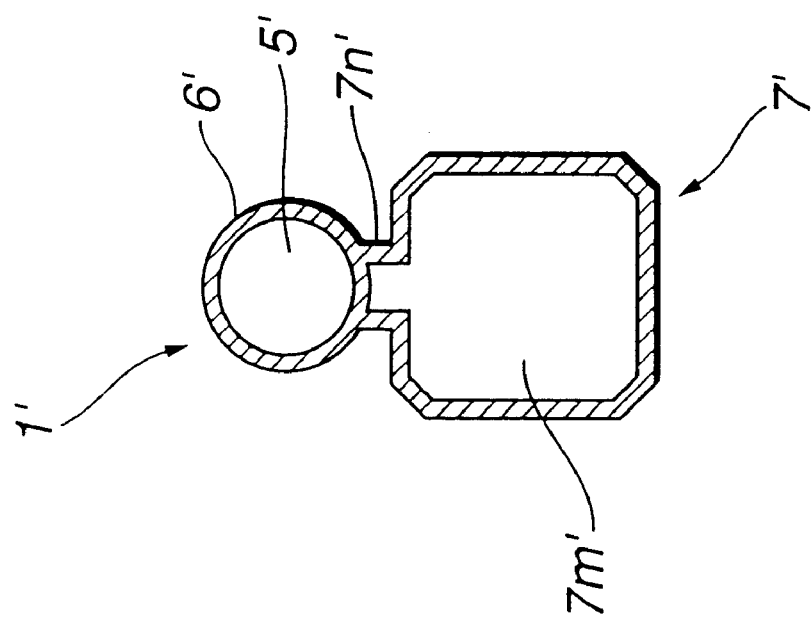
FIG. 17B is a vertical sectional view of the conventional sound-absorbing duct structure of FIG. 17A.
Figure 17A:
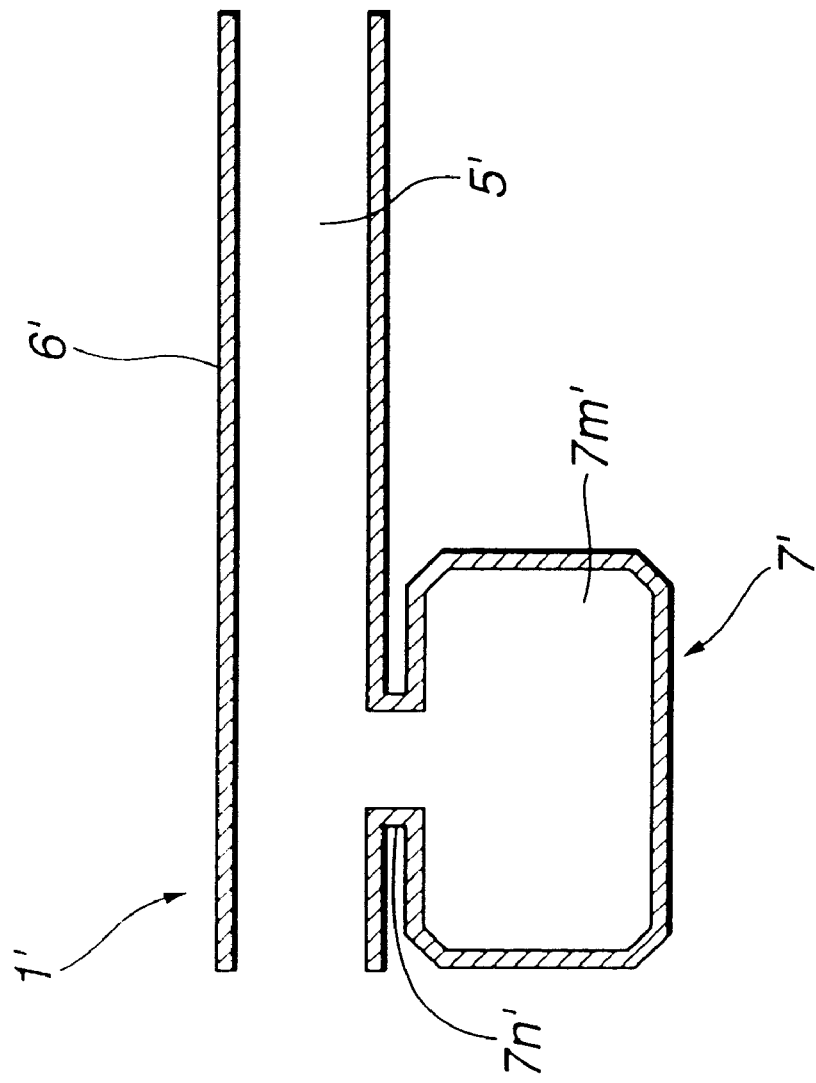
FIG. 17A is a longitudinal sectional view of a conventional sound-absorbing duct structure.

The sound-absorbing duct structure 1' of Reference 1 shown in FIGS. 17A and 17B corresponded to a conventional technique. The sound-absorbing duct structure of Reference 1 included a duct 6' (having an inner diameter of about 5 mm) which was provided with a resonator 7'. The resonator 7' has a chamber section 7m' which is connected through its neck section 7n' to the duct 6 so that a gas passage 5' is in communication with the inside of the chamber section 7m' through the neck section 7n'. The cross-sectional area of the opening of the neck section 7m' is 9 cm$^2$. The resonator 7 was set to make a resonance at a frequency of about 200 Hz. The thus prepared sound-absorbing duct structure 1' was subjected to the measurement of the noise reduction characteristics.

TABLE 1

| | Conductive layer | Piezoelectric film | | | | Insertion loss | | |
| --- | --- | --- | --- | --- | --- | --- | --- | --- |
| Sample | resistivity Ω · cm | Number | Polarization direction | Corresponding figure | Other matter | Low frequency range dB | Medium frequency range dB | High frequency range dB |
| Example 1 | 100 | 1 | — | FIG. 8 | | 14.8 | 14.9 | 20.2 |
| Example 2 | 100 | 1 | — | FIG. 9 | | 16.9 | 15.6 | 21.3 |
| Example 3 | 100 | 1 | — | FIG. 10 | | 16.7 | 16.6 | 21.4 |
| Example 4 | 100 | 1 | — | FIG. 11 | | 16.4 | 15.3 | 21.6 |
| Example 5 | 100 | 1 | — | FIG. 12 | | 17.8 | 16.3 | 22.0 |
| Example 6 | 100 | 1 | — | FIG. 13 | Resonator provided | 19.5 | 16.5 | 21.6 |
| Example 7 | 100 | 1 | — | FIG. 14 | | 20.7 | 20.1 | 23.5 |
| Example 8 | 100 | 2 | Same | FIG. 15 | | 17.8 | 16.0 | 23.0 |
| Example 9 | 100 | 2 | Opposite | FIG. 16 | | 19.4 | 20.4 | 22.9 |
| Example 10 | 10 | 1 | — | FIG. 9 | | 12.9 | 13.6 | 19.1 |
| Example 11 | 100000 | 1 | — | FIG. 9 | | 14.1 | 12.6 | 18.9 |
| Comparative Example 1 | 5 | 1 | — | FIG. 9 | | 12.3 | 13.5 | 18.6 |
| Comparative Example 2 | 220000 | 1 | — | FIG. 9 | | 13.5 | 12.6 | 17.9 |
| Comparative Example 3 | 100 | 1 | — | FIG. 9 | Non-piezoelectric film | 7.1 | 11.3 | 18.0 |
| Reference 1 | — | — | — | FIG. 17 | Only resonator | 10.0 | 8.0 | 12.2 |

Comparative Example 2

The sound-absorbing duct structure of Comparative Example 2 was prepared to be identical with that of Example 2 shown in FIGS. 9A to 9C with the exception that each electrically conductive layer 3 constituted of the non-woven fabric (sound-absorbing material) of carbon fiber had a volume resistivity of 220000 Ω·cm, lower than that in Example 11. The thus prepared sound-absorbing duct structure 1 was subjected to the measurement of the noise reduction characteristics.

Comparative Example 3

The sound-absorbing duct structure of Comparative Example 3 was prepared to be identical with that of Example 2 shown in FIGS. 9A to 9C with the exception that the cylindrical piezoelectric film 2 formed of polyvinylidene fluoride (PVDF) was replaced with a non-piezoelectric film of polyvinylidene fluoride (PVDF) which film had not been subjected to the piezoelectric treatment. The thus prepared sound-absorbing duct structure 1 was subjected to the measurement of the noise reduction characteristics.

As apparent from the measurement results shown in Table 1, it has been confirmed that all the sound-absorbing duct structures 1 of Examples 1 to 11 exhibited excellent noise reduction characteristics throughout whole frequency ranges.

The entire contents of Japanese Patent Applications P10-362878 (filed Dec. 21, 1998) are incorporated herein by reference.

Although the invention has been described above by reference to certain embodiments of the invention, the invention was not limited to the embodiments described above. Modifications and variations of the embodiments described above will occur to those skilled in the art, in light of the above teachings. The scope of the invention was defined with reference to the following claims.

What is claimed is:

1. A sound-absorbing duct structure for an intake system of an automotive internal combustion engine, comprising:
   a duct defining thereinside a gas passage, a part of said duct being formed with a plurality of small holes, said duct being connected to an air intake duct of an air cleaner so that the gas passage forms part of an air intake passage through which intake air is supplied to the engine; and a sound-absorbing section arranged in communication with the gas passage, through the small holes, including:
a piezoelectric material exhibiting a piezoelectric effect, said piezoelectric material being adapted to generate electric charge upon application of sound pressure in the gas pressure, and
an electrically conductive material in contact with said piezoelectric material and adapted to be supplied with the electric charge from said piezoelectric material so as to consume the electrical charge.

2. A sound-absorbing duct structure for an intake system of an automotive internal combustion engine, comprising:
a duct defining thereinside a gas passage, a first part of said duct being formed with a plurality of small holes, said duct being connected to an air intake duct of an air cleaner so that the gas passage forms part of an intake air passage through which intake air is supplied to the engine;
a first expanded duct section formed around the first part of said duct, said expanded duct section defining therein an inside space which is in communication with the gas passage through the small holes, the inside space having a cross-sectional area larger than that of the gas passage;
a first sound-absorbing section disposed in at least a part of the inside space of said first expanded duct section, said first sound absorbing section including an piezoelectric material exhibiting a piezoelectric effect, said piezoelectric material being adapted to generate electric charge upon application of sound pressure in said first expanded duct section, and an electrically conductive material in contact with said piezoelectric material which is adapted to be supplied with the electric charge from said piezoelectric material so as to consume the electrical charge.

3. A sound-absorbing duct structure comprising:
a sound-absorbing section arranged in communication with a gas passage, including:
a piezoelectric material exhibiting a piezoelectric effect,
an electrically conductive material in contact with said piezoelectric material, and
at least one cavity type resonator connected to said duct and in communication with the gas passage, said cavity type resonator being arranged to have a resonant frequency which is set to attenuate noise in said duct.

4. A sound-absorbing duct structure as claimed in claim 3, wherein said resonant frequency is set to attenuate noise generated by a resonance produced, in a frequency range, under an acoustically changing effect of said first sound-absorbing section, said resonant frequency being set at a frequency within the frequency range.

5. A sound-absorbing duct structure as claimed in claim 2, further comprising:
a second expanded duct section formed around a second part of said duct, the second part being formed with a plurality of small holes, said second expanded duct section defining therein an inside space which is in communication with the gas passage through the small holes, the inside space having a cross-sectional area larger than that of the gas passage; and
a second sound-absorbing section disposed in at least a part of the inside space of said expanded duct section, said second sound absorbing section including an piezoelectric material exhibiting a piezoelectric effect, and an electrically conductive material in contact with said piezoelectric material, said second sound-absorbing section being located and arranged to attenuate noise in said duct.

6. A sound-absorbing duct structure as claimed in claim 5, wherein said second sound-absorbing section is located and arranged to attenuate noise generated by a resonance produced, in a frequency range, under an acoustically changing effect of said first sound-absorbing section, said second sound-absorbing section being located and arranged corresponding to a frequency within the frequency range.

7. A sound-absorbing duct structure comprising:
a duct defining thereinside a gas passage, a first part of said duct being formed with a plurality of small holes;
a first expanded duct section formed around the first part of said duct, said expanded duct section defining therein an inside space which is in communication with the gas passage through the small holes, the inside space having a cross-sectional area larger than that of the gas passage; and
a first sound-absorbing section disposed in at least a part of the inside space of said first sound absorbing section including an piezoelectric material exhibiting a piezoelectric effect, and an electrically conductive material in contact with said piezoelectric material; and
wherein said piezoelectric material includes a plurality of piezoelectric layers, and said electrically conductive material includes a plurality of electrically-conductive layers, and
wherein each piezoelectric layer is interposed between the adjacent two electrically conductive layers so as to form a laminated structure of the piezoelectric layers and the electrically conductive layers.

8. A sound-absorbing duct structure as claimed in claim 7, wherein the adjacent two piezoelectric layers are different in direction of polarization of piezoelectricity in a direction of thickness of each piezoelectric layer.

9. A sound-absorbing duct structure comprising:
a duct defining thereinside a gas passage, a first part of said duct being formed with a plurality of small holes;
a first expanded duct section formed around the first part of said duct, said expanded duct section defining therein an inside space which is in communication with the gas passage through the small holes, the inside space having a cross-sectional area larger than that of the gas passage; and
a first sound-absorbing section disposed in at least a part of the inside space of said first sound absorbing section including an piezoelectric material exhibiting a piezoelectric effect, and an electrically conductive material in contact with said piezoelectric material; and
wherein said electrically conductive material has a volume resistivity ranging from 10 to 100000 $\Omega \cdot cm$.

10. A sound-absorbing duct structure as claimed in claim 2, wherein said electrically conductive material is a fabric which is mainly constituted of carbon fiber.

11. A sound-absorbing duct structure as claimed in claim 2, wherein said fabric is mainly constituted of carbon fiber, and binder fiber made of a thermoplastic resin.

12. A sound-absorbing duct structure as claimed in claim 2, wherein said piezoelectric material is a piezoelectric film formed of a plastic.

13. A sound-absorbing duct structure comprising:
a duct defining thereinside a gas passage, a first part of said duct being formed with a plurality of small holes;

a first expanded duct section formed around the first part of said duct, said expanded duct section defining therein an inside space which is in communication with the gas passage through the small holes, the inside space having a cross-sectional area larger than that of the gas passage; and a first sound-absorbing section disposed in at least a part of the inside space of said first sound absorbing section including an piezoelectric material exhibiting a piezoelectric effect, and an electrically conductive material in contact with said piezoelectric material; and wherein said piezoelectric material is a film formed of polyvinylidene fluoride and subjected to a poling treatment.

14. A sound-absorbing duct structure for an intake system of an automotive internal combustion engine, comprising:

a duct defining thereinside a gas passage, a part of said duct being formed with a plurality of small holes, said duct being connected to an air intake duct of an air cleaner so that the gas passage forms part of an air intake passage through which intake air is supplied to the engine;

a sound-absorbing section in communication with the gas passage, through the small holes, said sound-absorbing section including an piezoelectric material exhibiting a piezoelectric effect, said piezoelectric material being adapted to generate electric charge upon application of sound pressure in said first expanded duct section, and an electrically conductive material in contact with said piezoelectric material, said electrically conductive material being adapted to be supplied with the electric charge from said piezoelectric material so as to consume the electrical charge; and means for causing a gas to flow through the gas passage so as to allow a sound pressure due to flow of the gas is absorbed in said sound-absorbing section.

15. A sound-absorbing duct structure for an intake system of an automotive internal combustion engine, comprising:

a duct defining thereinside a gas passage, a part of said duct being formed with a plurality of small holes, said duct being connected to an air intake duct of an air cleaner so that the gas passage forms part of an air intake passage through which intake air is supplied to the engine;

an expanded duct section formed around the part of said duct, said expanded duct section defining therein an inside space which is in communication with the gas passage through the small holes, the inside space having a cross-sectional area larger than that of the gas passage; and a sound-absorbing section disposed in at least a part of the inside space of said expanded duct section, said sound absorbing section including an piezoelectric material exhibiting a piezoelectric effect, and an electrically conductive material in contact with said piezoelectric material.

16. A method of absorbing sound in a gas passage defined in a duct, a part of the duct being formed with a plurality of small holes, the duct being connected to an air intake duct of an air cleaner of an intake system of an automotive internal combustion engine so that the gas passage forms part of an air intake passage through which intake air is supplied to the engine, said method comprising:

disposing a sound-absorbing section in communication with the gas passage through the small holes, said sound-absorbing section including an piezoelectric material exhibiting a piezoelectric effect, said piezoelectric material being adapted to generate electric charge upon application of sound pressure in said first expanded duct section, and an electrically conductive material in contact with said piezoelectric material, said electrically conductive material being adapted to be supplied with the electric charge from said piezoelectric material so as to consume the electrical charge; and causing a gas to flow through the gas passage so as to cause the sound pressure due to flow of the gas is absorbed in said sound-absorbing section.

* * * * *